(12) United States Patent
Wu et al.

(10) Patent No.: US 12,598,041 B2
(45) Date of Patent: Apr. 7, 2026

(54) METHOD AND APPARATUS FOR BEAM MANAGEMENT IN WIRELESS NETWORK

(71) Applicant: APOGEE NETWORKS, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 154 days.

(21) Appl. No.: 18/218,015

(22) Filed: Jul. 4, 2023

(65) Prior Publication Data

US 2023/0353304 A1 Nov. 2, 2023

Related U.S. Application Data

(63) Continuation of application No. PCT/CN2022/072035, filed on Jan. 14, 2022.

(30) Foreign Application Priority Data

Jan. 18, 2021 (CN) .......................... 202110060929.3
May 21, 2021 (CN) .......................... 202110556017.5

(51) Int. Cl.
*H04L 5/00* (2006.01)

(52) U.S. Cl.
CPC .......... *H04L 5/0048* (2013.01); *H04L 5/0053* (2013.01)

(58) Field of Classification Search
CPC ............................ H04L 5/0048; H04L 5/0053
See application file for complete search history.

(56) References Cited

U.S. PATENT DOCUMENTS

| | | | |
|---|---|---|---|
| 10,205,494 B2 * | 2/2019 | Kim | ....................... H04L 1/0031 |
| 11,108,516 B2 * | 8/2021 | Kim | ......................... H04L 5/00 |
| 2018/0302889 A1 | 10/2018 | Guo et al. | |

(Continued)

FOREIGN PATENT DOCUMENTS

| | | |
|---|---|---|
| CN | 111988757 A | 11/2020 |
| CN | 112187424 A | 1/2021 |
| WO | 2020233405 A1 | 11/2020 |

OTHER PUBLICATIONS

ISR received in application No. PCT/CN2022/072035 dated Mar. 31, 2022.

(Continued)

*Primary Examiner* — Chandrahas B Patel
(74) *Attorney, Agent, or Firm* — VOLPE KOENIG

(57) ABSTRACT

Disclosure provides a method and device in a node for wireless communications. A first node receives a first signaling; monitors a first-type channel in a first resource pool set; the first signaling is used to determine a target time and a first reference signal; a first resource pool subset and a second resource pool subset are respectively subsets of the first resource pool set; after the target time, for the monitoring in the target resource pool subset, the first node assumes same QCL parameters as the first reference signal; when the first reference signal belongs to the first reference signal set, the target resource pool subset is the first resource pool subset; and when the first reference signal belongs to the second reference signal set, the target resource pool subset is the second resource pool subset; when an updated beam is a beam of an adjacent cell.

15 Claims, 5 Drawing Sheets

(56) References Cited

U.S. PATENT DOCUMENTS

2019/0297603 A1      9/2019  Guo et al.
2022/0295532 A1*    9/2022  Gao ...................... H04W 72/23

OTHER PUBLICATIONS

First Office Action of Chinese patent application No. CN202110556017.5 dated Jan. 10, 2024.
First Search Report of Chinese patent application No. CN202110556017.5 dated Jan. 9, 2024.
Intel Corporation "Corrections to reference signals and QCL" 3GPP TSG RAN WG1 Meeting #94 R1-1808670 Aug. 11, 2018.
Interdigital, Inc. "Physical Layer Structure for NR V2X Sidelink" 3GPP TSG RAN WG1 #98bis R1-1911276 Oct. 8, 2019.

* cited by examiner

100

First node

101

Receiving first signaling

102

Monitoring first-type channel in first resource pool set

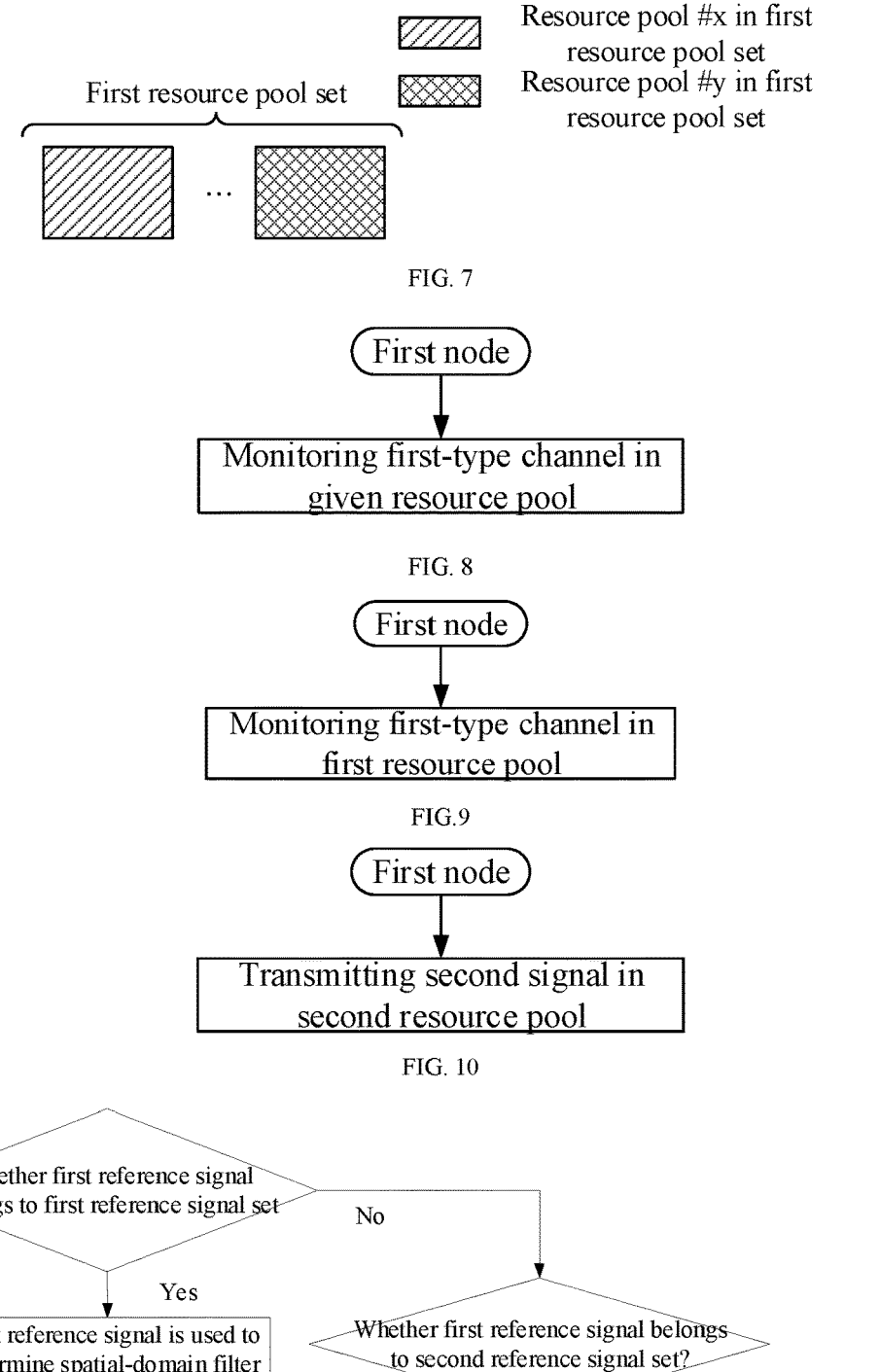

First resource pool set

▨ Resource pool #x in first resource pool set

▨ Resource pool #y in first resource pool set

First node

↓

Monitoring first-type channel in given resource pool

FIG. 8

First node

↓

Monitoring first-type channel in first resource pool

FIG.9

First node

↓

Transmitting second signal in second resource pool

FIG. 10

Whether first reference signal belongs to first reference signal set

No →

Yes ↓

First reference signal is used to determine spatial-domain filter of second signal Whether first reference signal belongs to second reference signal set?

Yes ↓

Whether second resource pool belongs to third resource pool subset

No →

Yes ↓

First reference signal is used to determine spatial-domain filter of second signal Spatial-domain filter of second signal is unrelated to first reference signal

FIG. 11 being used to determine

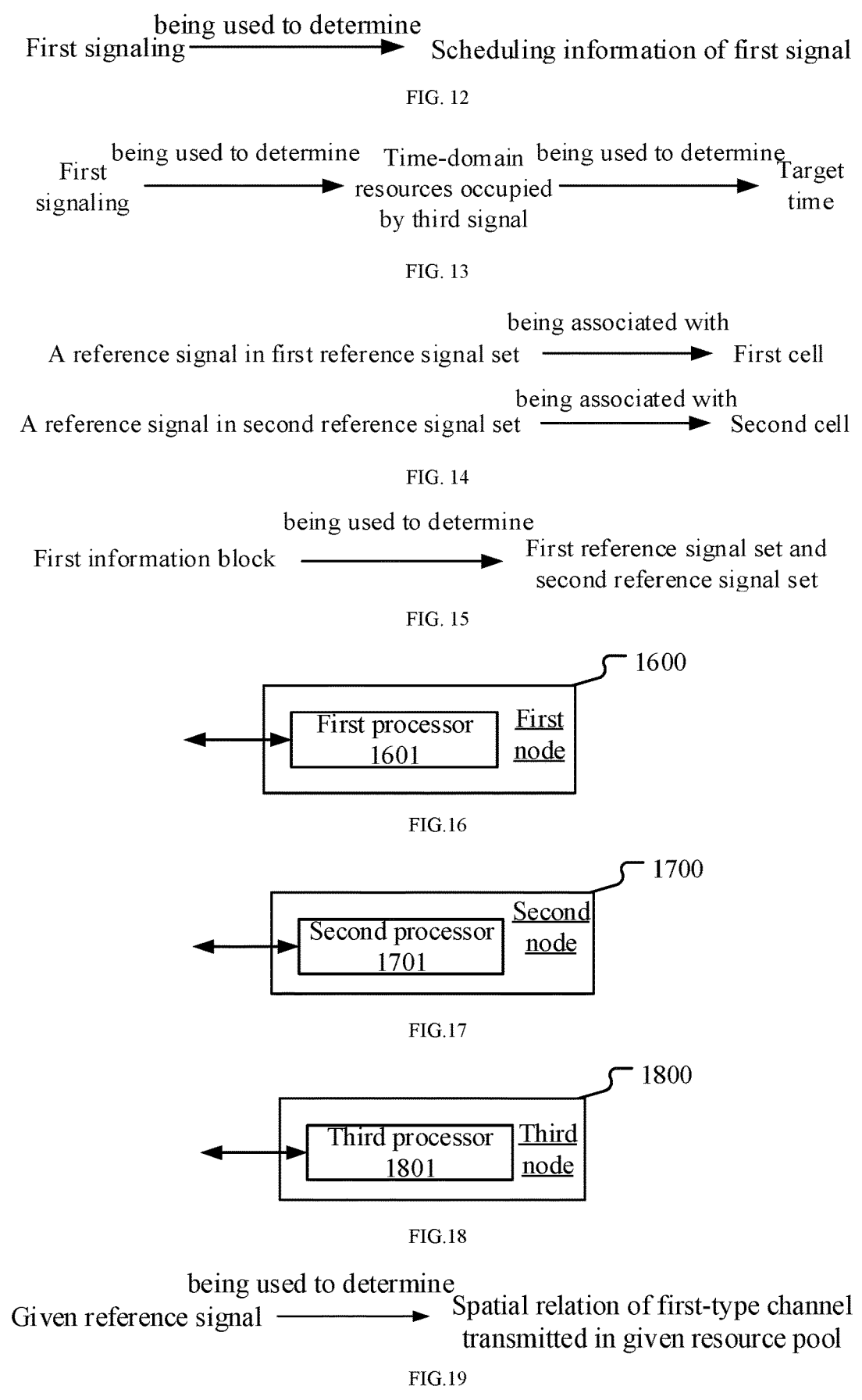

First signaling ─────────────────────▶ Scheduling information of first signal

FIG. 12

First
signaling being used to determine
─────────────────────▶

Time-domain
resources occupied
by third signal being used to determine
─────────────────────▶

Target
time

FIG. 13 being associated with

A reference signal in first reference signal set ─────────────────────▶ First cell being associated with A reference signal in second reference signal set ─────────────────────▶ Second cell

FIG. 14 being used to determine

First information block ─────────────────────▶ First reference signal set and
second reference signal set

◀───▶  | First processor 1601 | First node |

◀───▶  | Second processor 1701 | Second node |

◀───▶  | Third processor 1801 | Third node |

FIG.18 being used to determine

Given reference signal ─────────────────────▶ Spatial relation of first-type channel
transmitted in given resource pool

FIG.19

METHOD AND APPARATUS FOR BEAM MANAGEMENT IN WIRELESS NETWORK

CROSS-REFERENCE TO RELATED APPLICATION

This application is a continuation of International Application No. PCT/CN2022/072035, filed Jan. 14, 2022, claims the priority benefit of Chinese patent Application No. 202110060929.3, filed on Jan. 18, 2021, and claims the priority benefit of Chinese patent application No. 202110556017.5, filed on May 21, 2021 the full disclosure of which is incorporated herein by reference.

BACKGROUND

Technical Field

The present disclosure relates to transmission methods and devices in wireless communication systems, and in particular to a method and device of radio signal transmission in a wireless communication system supporting cellular networks.

Related Art

In Long-term Evolution (LTE) system, inter-cell handover is controlled by a base station based on a measurement of a User Equipment (UE). Inter-cell handover in 3rd Generation Partner Project (3GPP) Release 15 (R15) basically follows the mechanism in LTE. In New Radio (NR) system, more application scenarios need to be supported. Some application scenarios, such as Ultra-Reliable and Low Latency Communications (URLLC), put forward high requirements for delay as well as new challenges for inter-cell handover. In 3GPP Radio Access Network (RAN) 1 #102e and #103e meetings, introducing a Transmission Configuration Indicator (TCI) state associated with a reference signal of an adjacent cell to realize fast cross-cell beam handover was discussed to improve the performance of cell boundary users.

In NR R15 and R16, a control channel and a data channel adopt different beam management/indication mechanisms, and uplink and downlink also adopt different beam management/indication mechanisms. While in many cases, the control channel and the data channel can adopt a same beam, and in many application scenarios there is channel reciprocity between uplink and downlink channels, so a same beam can be adopted. In 3GPP Radio Access Network (RAN) 1 #103e meeting, the technology of utilizing a physical layer signaling to update beams of the control channel and data channel at the same time has been adopted.

SUMMARY

Inventors have found through researches that after introducing a TCI state associated with a reference signal of an adjacent cell, what impact does it have on beam update of a control channel and a data channel need to be solved. For example, if the updated beam is a beam of the adjacent cell, the user can receive data/signaling through the beam of the adjacent cell to ensure the communication quality, but communications with the cell still need to be maintained before cell handover.

To address the above problem, the present disclosure provides a solution. It should be noted that although the above description takes the cellular networks as an example, the application is also applicable to other scenarios, such as Vehicle-to-Everything (V2X) scenario, where similar technical effects can be achieved. Besides, a unified solution for different scenarios (including but not limited to cellular networks and V2X) can also help reduce hardware complexity and cost. If no conflict is incurred, embodiments and the characteristics of the embodiments in any of a first node, a second node or a third node in the present disclosure are also applicable to the other two nodes. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling, the first signaling being used to determine a target time; and monitoring a first-type channel in a first resource pool set, the first resource pool set comprising more than one first-type resource pool;

herein, the first signaling is used to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node assumes same QCL parameters as the first reference signal; the first reference signal belongs to a first reference signal set or a second reference signal set, and the first reference signal set and the second reference signal set respectively comprise at least one reference signal; based on whether the first reference signal belongs to the first reference signal set or the second reference signal set, the UE determines in which first-type resource pool(s) the UE assumes same QCL parameters as the first reference signal for the first-type channel monitoring after the target time; when the first reference signal belongs to the first reference signal set, the target resource pool subset is the first resource pool subset; and when the first reference signal belongs to the second reference signal set, the target resource pool subset is the second resource pool subset.

In one embodiment, a problem to be solved in the present disclosure includes: when the updated beam is a beam of an adjacent cell, how can the user maintain communications with the cell. In the above scheme, the user determines which beams on the control channel are updated according to whether the updated beam is the beam of the adjacent cell or the beam of its own cell, so as to solve this problem.

In one embodiment, characteristics of the above method include: the first reference signal represents an updated beam; the first node determines which first-type resource pools adopt updated beams according to whether the first reference signal belongs to the first reference signal set or the second reference signal set.

In one embodiment, advantages of the above method include: according to characteristics of the updated beams, a channel for beam update is appropriately selected.

In one embodiment, advantages of the above method include: when the updated beam is the beam of the adjacent cell, it is ensured that the user is still in communications with the cell before cell handover.

According to one aspect of the present disclosure, it is characterized in that a first resource pool is a first-type resource pool in the first resource pool set; before the target time, for the first-type channel monitoring performed in the first resource pool, the first node assumes same QCL parameters as a second reference signal.

According to one aspect of the present disclosure, it is characterized in that the target resource pool subset only comprises partial first-type resource pools in the first resource pool set, and the first resource pool is a first-type resource pool in the first resource pool set not belonging to the target resource pool subset; after the target time, for the first-type channel monitoring performed in the first resource pool, the first node assumes same QCL parameters as the second reference signal.

According to one aspect of the present disclosure, comprising:

transmitting a second signal in a second resource pool;

herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

According to one aspect of the present disclosure, comprising:

receiving a first signal;

herein, the first signaling is used to determine scheduling information of the first signal.

According to one aspect of the present disclosure, comprising:

transmitting a third signal;

herein, the third signal is used to determine that the first signaling is correctly received; time-domain resources occupied by the third signal are used to determine the target time, and the first signaling is used to determine the time-domain resources occupied by the third signal.

According to one aspect of the present disclosure, comprising:

receiving a first signal; and transmitting a third signal;

herein, the first signaling is used to determine scheduling information of the first signal; the third signal is used to determine that the first signaling is correctly received; time-domain resources occupied by the third signal are used to determine the target time, and the first signaling is used to determine the time-domain resources occupied by the third signal.

According to one aspect of the present disclosure, it is characterized in that there exists a reference signal in the first reference signal set being associated with a first cell, and there exists a reference signal in the second reference signal set being associated with a second cell.

According to one aspect of the present disclosure, comprising:

receiving a first information block;

herein, the first information block is used to determine the first reference signal set and the second reference signal set.

According to one aspect of the present disclosure, wherein the first node is a UE.

According to one aspect of the present disclosure, wherein the first node is a relay node.

The present disclosure provides a method in a second node for wireless communications, comprising:

transmitting a first signaling, the first signaling being used to determine a target time; and after the target time, transmitting a first-type channel in a target resource pool subset, or, after the target time, dropping transmitting a first-type channel in a target resource pool subset;

herein, the first signaling is used to determine a first reference signal; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; after the target time, the first reference signal is used to determine a spatial relation of the first-type channel transmitted in the target resource pool subset; the first reference signal belongs to a first reference signal set or a second reference signal set, and the first reference signal set and the second reference signal set respectively comprise at least one reference signal; whether the first reference signal belongs to the first reference signal set or the second reference signal set is used to determine in which first-type resource pool(s) the first reference signal is used to determine the spatial relation of the first-type channel after the target time; when the first reference signal belongs to the first reference signal set, the target resource pool subset is the first resource pool subset; and when the first reference signal belongs to the second reference signal set, the target resource pool subset is the second resource pool subset.

According to one aspect of the present disclosure, it is characterized in that a first resource pool is a first-type resource pool in the first resource pool set; before the target time, a second reference signal is used to determine the spatial relation of the first-type channel transmitted in the first resource pool.

According to one aspect of the present disclosure, it is characterized in that the target resource pool subset only comprises partial first-type resource pools in the first resource pool set, and the first resource pool is a first-type resource pool in the first resource pool set not belonging to the target resource pool subset; after the target time, the second reference signal is used to determine the spatial relation of the first-type channel transmitted in the first resource pool.

According to one aspect of the present disclosure, comprising:

receiving a second signal in a second resource pool, or, dropping receiving a second signal in a second resource pool;

herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

According to one aspect of the present disclosure, comprising:

transmitting a first signal;

herein, the first signaling is used to determine scheduling information of the first signal.

According to one aspect of the present disclosure, comprising:

receiving a third signal;

herein, the third signal is used to determine that the first signaling is correctly received; time-domain resources occupied by the third signal are used to determine the target time, and the first signaling is used to determine the time-domain resources occupied by the third signal.

According to one aspect of the present disclosure, comprising:

transmitting a first signal; and receiving a third signal;

herein, the first signaling is used to determine scheduling information of the first signal; the third signal is used to determine that the first signaling is correctly received; time-domain resources occupied by the third signal are used to determine the target time, and the first signaling is used to determine the time-domain resources occupied by the third signal.

According to one aspect of the present disclosure, it is characterized in that there exists a reference signal in the first reference signal set being associated with a first cell, and there exists a reference signal in the second reference signal set being associated with a second cell.

According to one aspect of the present disclosure, comprising:

transmitting a first information block;

herein, the first information block is used to determine the first reference signal set and the second reference signal set.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communications, comprising:

a first processor, receiving a first signaling, monitoring a first-type channel in a first resource pool set;

wherein the first signaling is used to determine a target time; the first resource pool set comprises more than one first-type resource pool; the first signaling is used to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node assumes same QCL parameters as the first reference signal; the first reference signal belongs to a first reference signal set or a second reference signal set, and the first reference signal set and the second reference signal set respectively comprise at least one reference signal; based on whether the first reference signal belongs to the first reference signal set or the second reference signal set, the UE determines in which first-type resource pool(s) the UE assumes same QCL parameters as the first reference signal for the first-type channel monitoring after the target time; when the first reference signal belongs to the first reference signal set, the target resource pool subset is the first resource pool subset; and when the first reference signal belongs to the second reference signal set, the target resource pool subset is the second resource pool subset.

The present disclosure provides a second node for wireless communications, comprising:

a second processor, transmitting a first signaling, the first signaling being used to determine a target time; and the second processor transmitting a first-type channel in a target resource pool subset after the target time, or, the second processor dropping transmitting a first-type channel in a target resource pool subset after the target time;

herein, the first signaling is used to determine a first reference signal; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; after the target time, the first reference signal is used to determine a spatial relation of the first-type channel transmitted in the target resource pool subset; the first reference signal belongs to a first reference signal set or a second reference signal set, and the first reference signal set and the second reference signal set respectively comprise at least one reference signal; whether the first reference signal belongs to the first reference signal set or the second reference signal set is used to determine in which first-type resource pool(s) the first reference signal is used to determine the spatial relation of the first-type channel after the target time; when the first reference signal belongs to the first reference signal set, the target resource pool subset is the first resource pool subset; and when the first reference signal belongs to the second reference signal set, the target resource pool subset is the second resource pool subset.

The present disclosure provides a method in a third node for wireless communications, comprising:

transmitting a first-type channel in a target resource pool subset, or, dropping transmitting a first-type channel in a target resource pool subset;

herein, a second information block is used to determine whether the first-type channel is transmitted in the target resource pool subset; when the second information block is used to determine that the first-type channel is transmitted in the target resource pool subset, the second information block indicates a first reference signal, and the first reference signal is used to determine a spatial relation of the first-type channel transmitted in the target resource pool subset; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; the first reference signal belongs to a first reference signal set or a second reference signal set, and the first reference signal set and the second reference signal set respectively comprise at least one reference signal; when the first reference signal belongs to the first reference signal set, the target resource pool subset is the first resource pool subset; and when the first reference signal belongs to the second reference signal set, the target resource pool subset is the second resource pool subset.

According to one aspect of the present disclosure, comprising:

receiving the second information block.

According to one aspect of the present disclosure, comprising:

receiving a second signal in a second resource pool, or, dropping receiving a second signal in a second resource pool;

herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

According to one aspect of the present disclosure, it is characterized in that there exists a reference signal in the first reference signal set being associated with a first cell, and there exists a reference signal in the second reference signal set being associated with a second cell.

According to one aspect of the present disclosure, wherein the third node is a base station.

According to one aspect of the present disclosure, wherein the third node is a UE.

According to one aspect of the present disclosure, wherein the third node is a relay node.

The present disclosure provides a third node for wireless communications, comprising:

a third processor, transmitting a first-type channel in a target resource pool subset, or, dropping transmitting a first-type channel in a target resource pool subset;

herein, a second information block is used to determine whether the first-type channel is transmitted in the target resource pool subset; when the second information block is used to determine that the first-type channel is transmitted in the target resource pool subset, the second information block indicates a first reference signal, and the first reference signal is used to determine a spatial relation of the first-type channel transmitted in the target resource pool subset; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; the first reference signal belongs to a first reference signal set or a second reference signal set, and the first reference signal set and the second reference signal set respectively comprise at least one reference signal; when the first reference signal belongs to the first reference signal set, the target resource pool subset is the first resource pool subset; and when the first reference signal belongs to the second reference signal set, the target resource pool subset is the second resource pool subset.

In one embodiment, the present disclosure has the following advantages over conventional schemes:

according to the characteristics of the updated beam, a channel for the beam update is appropriately selected;

when the updated beam is the beam of the adjacent cell, it is ensured that the user is still in communications with the cell before cell handover.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates a schematic diagram of a first resource pool set according to one embodiment of the present disclosure;

FIG. 8 illustrates a schematic diagram of a first node monitoring a first-type channel in a given resource pool according to one embodiment of the present disclosure;

FIG. 9 illustrates a schematic diagram of a first node monitoring a first-type channel in a first resource pool according to one embodiment of the present disclosure;

FIG. 10 illustrates a schematic diagram of a first node transmitting a second signal in a second resource pool according to one embodiment of the present disclosure;

FIG. 11 illustrates a schematic diagram of relations among a first reference signal, a second resource pool and a spatial-domain filter of a second signal according to one embodiment of the present disclosure;

FIG. 12 illustrates a schematic diagram of a first signaling and a first signal according to one embodiment of the present disclosure;

FIG. 13 illustrates a schematic diagram of a first signaling, a third signal and a target time according to one embodiment of the present disclosure;

FIG. 14 illustrates a schematic diagram of there existing a reference signal in a first reference signal set being associated with a first cell and there exists a reference signal in a second reference signal set being associated with a second cell according to one embodiment of the present disclosure;

FIG. 15 illustrates a schematic diagram of a first information block according to one embodiment of the present disclosure;

FIG. 16 illustrates a structure block diagram of a processing device in a first node according to one embodiment of the present disclosure;

FIG. 17 illustrates a structure block diagram of a processing device in a second node according to one embodiment of the present disclosure;

FIG. 18 illustrates a structure block diagram of a processing device in a third node according to one embodiment of the present disclosure;

FIG. 19 illustrates a schematic diagram of a given reference signal being used to determine a spatial relation of a first-type channel transmitted in a given resource pool according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
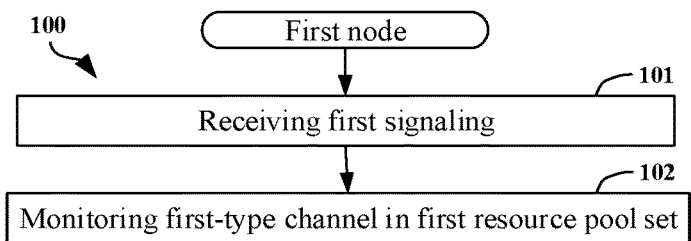
FIG. 1 illustrates a flowchart of a first signaling and a first-type channel according to one embodiment of the present disclosure.

Embodiment 1 illustrates a flowchart of a first signaling and a first-type channel according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first signaling in step 101, and the first signaling is used to determine a target time; monitors a first-type channel in a first resource pool set in step 102, the first resource pool set comprises more than one first-type resource pool. Herein, the first signaling is used to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node assumes same QCL parameters as the first reference signal; the first reference signal belongs to a first reference signal set or a second reference signal set, and the first reference signal set and the second reference signal set respectively comprise at least one reference signal; based on whether the first reference signal belongs to the first reference signal set or the second reference signal set, the UE determines in which first-type resource pool(s) the UE assumes same QCL parameters as the first reference signal for the first-type channel monitoring after the target time; when the first reference signal belongs to the first reference signal set, the target resource pool subset is the first resource pool subset; and when the first reference signal belongs to the second reference signal set, the target resource pool subset is the second resource pool subset.

In one embodiment, whether the first reference signal belongs to the first reference signal set or the second reference signal set is used to determine whether the target resource pool subset is the first resource pool subset or the second resource pool subset.

In one embodiment, when the first reference signal belongs to the first reference signal set, the target resource pool subset is the first resource pool subset; and when the first reference signal belongs to the second reference signal set, the target resource pool subset is the second resource pool subset.

In one embodiment, a given first-type resource pool is any first-type resource pool in the first resource pool set; before the target time, for the first-type channel monitoring performed in the given first-type resource pool, the first node assumes same QCL parameters as a second reference signal.

In one embodiment, a given first-type resource pool is any first-type resource pool in the first resource pool set not belonging to the target resource pool subset; for the first-type channel monitoring performed in the given first-type resource pool, the first node assumes same QCL parameters before the target time and after the target time.

In one subembodiment of the above embodiment, for the first-type channel monitoring performed in the given first-type resource pool, the first node assumes same QCL parameters as the second reference signal before the target time and after the target time.

In one embodiment, in response to the behavior of receiving the first signaling, and for the first-type channel monitoring performed in the target resource pool subset, the first node assumes same QCL parameters as the first reference signal after the target time.

In one embodiment, in response to the behavior of receiving the first signaling, for the first-type channel monitoring performed in the target resource pool subset, the first node assumes same QCL parameters as the first reference signal starting from the target time.

In one embodiment, the meaning of the phrase of "for the first-type channel monitoring performed in the target resource pool subset, the first node assumes same QCL parameters as the first reference signal" includes: for the first-type channel monitoring performed in any first-type resource pool in the target resource pool subset, the first node assumes same QCL parameters as the first reference signal.

In one embodiment, the first signaling comprises a physical-layer signaling.

In one embodiment, the first signaling is a physical-layer signaling.

In one embodiment, the first signaling comprises a dynamic signaling.

In one embodiment, the first signaling comprises a layer 1 (L1) signaling.

In one embodiment, the first signaling is an L1 signaling.

In one embodiment, the first signaling comprises an L1 control signaling.

In one embodiment, the first signaling comprises DownLink Control Information (DCI).

In one embodiment, the first signaling is DCI.

In one embodiment, the first signaling comprises DCI used for a DownLink Grant.

In one embodiment, the first signaling comprises DCI used for an UpLink Grant.

In one embodiment, time-domain resources occupied by the first signaling are used to determine the target time.

In one embodiment, a time interval between the target time and the first reference time is a first interval; the first reference time is not later than the target time, and time-domain resources occupied by the first signaling are used to determine the first reference time.

In one embodiment, the first reference time is a start time of time-domain resources occupied by the first signaling.

In one embodiment, the first reference time is an end time of time-domain resources occupied by the first signaling.

In one embodiment, the first reference time is a start time of a time unit occupied by the first signaling.

In one embodiment, the first reference time is an end time of a time unit occupied by the first signaling.

In one embodiment, the time unit is a slot.

In one embodiment, the time unit is a sub-slot.

In one embodiment, the time unit is a symbol.

In one embodiment, the time unit comprises more than one consecutive symbol.

In one embodiment, a number of symbols comprised in the time unit is configured by a higher-layer parameter.

In one embodiment, the first interval is measured by the time unit.

In one embodiment, the first interval is measured by slot.

In one embodiment, the first interval is measured by sub-slot.

In one embodiment, the first interval is measured by symbol.

In one embodiment, the first interval is a non-negative integer.

In one embodiment, the first interval is equal to 0.

In one embodiment, the first interval is greater than 0.

In one embodiment, the first interval is fixed.

In one embodiment, the first interval is configured by a higher-layer parameter.

In one embodiment, the first signaling indicates the first interval.

In one embodiment, the first signaling indicates the target time.

In one embodiment, the first interval is equal to a sum of a second interval and a third interval, and the second interval and the third interval are respectively non-negative integers.

In one embodiment, the first signaling respectively indicates the second interval and the third interval.

In one embodiment, the first signaling indicates the second interval.

In one embodiment, the third interval is fixed.

In one embodiment, the third interval is configured by a higher-layer parameter.

In one embodiment, the first signaling indicates the first reference signal.

In one embodiment, the first signaling indicates an index of the first reference signal.

In one embodiment, the first signaling indicates a first Transmission Configuration Indicator (TCI) state, and the first TCI state indicates the first reference signal.

In one embodiment, the first signaling indicates a TCI codepoint corresponding to the first TCI state.

In one embodiment, the first signaling comprises a first field, and the first field comprises at least one bit; the first field in the first signaling indicates the first reference signal.

In one embodiment, the first field in the first signaling indicates the first TCI state.

In one embodiment, a value of the first field in the first signaling is equal to a TCI codepoint corresponding to the first TCI state.

In one embodiment, the first field comprises 3 bits.

In one embodiment, the first field comprises information in a Transmission configuration indication field.

In one embodiment, the specific meaning of the Transmission configuration indication field can be found in 3GPP TS38.212, section 7.3.

In one embodiment, the first reference signal comprises a Channel State Information-Reference Signal (CSI-RS).

In one embodiment, the first reference signal comprises a Non-Zero Power (NZP) CSI-RS.

In one embodiment, the first reference signal comprises a CSI-RS resource.

In one embodiment, the first reference signal comprises a Synchronization Signal/physical broadcast channel Block (SSB).

In one embodiment, the first reference signal comprises an SSB resource.

In one embodiment, the first reference signal comprises a Sounding Reference Signal (SRS).

In one embodiment, the first reference signal comprises an SRS resource.

In one embodiment, the first reference signal is a CSI-RS or an SSB.

In one embodiment, the first reference signal is one of a CSI-RS, an SSB or an SRS.

In one embodiment, the reference signal comprises a reference signal resource.

In one embodiment, the reference signal comprises a reference signal port.

In one embodiment, a modulation symbol comprised in the reference signal is known to the first node.

In one embodiment, an index of the first reference signal comprises an NZP-CSI-RS-ResourceId.

In one embodiment, an index of the first reference signal comprises an NZP-CSI-RS-ResourceSetId.

In one embodiment, an index of the first reference signal comprises an SSB-Index.

In one embodiment, an index of the first reference signal comprises an SRS-ResourceSetId.

In one embodiment, an index of the first reference signal comprises an SRS-ResourceId.

In one embodiment, the first reference signal set only comprises one reference signal.

In one embodiment, the first reference signal set comprises a plurality of reference signals.

In one embodiment, the first reference signal set comprises a CSI-RS.

In one embodiment, the second radio signal comprises an NZP CSI-RS.

In one embodiment, the first reference signal set comprises an SSB.

In one embodiment, the first reference signal set comprises an SRS.

In one embodiment, the second reference signal set only comprises one reference signal.

In one embodiment, the second reference signal set comprises a plurality of reference signals.

In one embodiment, the second reference signal set comprises a CSI-RS.

In one embodiment, the second reference signal set comprises an NZP CSI-RS.

In one embodiment, the second reference signal set comprises an SSB.

In one embodiment, the second reference signal set comprises an SRS.

In one embodiment, any reference signal in the first reference signal set does not belong to the second reference signal set.

In one embodiment, any reference signal in the second reference signal set does not belong to the first reference signal set.

In one embodiment, the first reference signal belongs to the first reference signal set.

In one embodiment, the first reference signal belongs to the second reference signal set.

In one embodiment, the first reference signal set is configured by a Radio Resource Control (RRC) signaling.

In one embodiment, the second reference signal set is configured by an RRC signaling.

In one embodiment, any reference signal in the first reference signal set is associated with the first resource pool subset, and any reference signal in the second reference signal set is associated with the second resource pool subset.

In one embodiment, any reference signal in the first reference signal set is a reference signal indicated by a TCI state of a resource pool in the first resource pool subset or being QCL with a reference signal indicated by a TCI state of a resource pool in the first resource pool subset; any reference signal in the second reference signal set is a reference signal indicated by a TCI state of a resource pool in the second resource pool subset or being QCL with a reference signal indicated by a TCI state of a resource pool in the second resource pool subset.

In one embodiment, a type of any reference signal in the first reference signal set is different from a type of any reference signal in the second reference signal set; a type of a reference signal comprises at least one of a time-domain behavior, whether configured with a higher-layer parameter trs-Info, whether configured with a higher-layer parameter repetition, a value of a configured higher-layer parameter repetition, a CSI-RS, an SSB or an SRS.

In one embodiment, a time-domain behavior of any reference signal in the first reference signal set is periodic, and a time-domain behavior of any reference signal in the second reference signal set is aperiodic.

In one embodiment, a time-domain behavior of any reference signal in the first reference signal set is periodic or semi-persistent, and a time-domain behavior of any reference signal in the second reference signal set is aperiodic.

In one embodiment, a time-domain behavior of any reference signal in the second reference signal set is periodic, and a time-domain behavior of any reference signal in the first reference signal set is aperiodic.

In one embodiment, any reference signal in the first reference signal set is configured with a higher-layer parameter trs-Info, and any reference signal in the second reference signal set is not configured with a higher-layer parameter trs-Info.

In one embodiment, any reference signal in the first reference signal set is not configured with a higher-layer parameter trs-Info, and any reference signal in the second reference signal set is configured with a higher-layer parameter trs-Info.

In one embodiment, any reference signal in the first reference signal set is configured with a higher-layer parameter repetition set to on, and any reference signal in the second reference signal set is not configured with a higher-layer parameter repetition or configured with a higher-layer parameter repetition set to off.

In one embodiment, any reference signal in the second reference signal set is configured with a higher-layer parameter repetition set to on, and any reference signal in the first reference signal set is not configured with a higher-layer parameter repetition or configured with a higher-layer parameter repetition set to off.

In one embodiment, the first reference signal only belongs to one of the first reference signal set or the second reference signal set.

In one embodiment, one reference signal in the first reference signal set occurs periodically in time domain.

In one embodiment, one reference signal in the first reference signal set occurs only once in time domain.

In one embodiment, one reference signal in the second reference signal set occurs periodically in time domain.

In one embodiment, one reference signal in the second reference signal set occurs only once in time domain.

In one embodiment, the target resource pool subset is the first resource pool subset.

In one embodiment, the target resource pool subset is the second resource pool subset.

In one embodiment, the first-type channel comprises a physical channel.

In one embodiment, the first-type channel is a physical channel.

In one embodiment, the first-type channel comprises an L1 channel.

In one embodiment, the first-type channel is an L1 channel.

In one embodiment, the first-type channel comprises a downlink physical layer control channel (i.e., a downlink channel only capable of bearing a physical layer signaling).

In one embodiment, the first-type channel comprises a Physical Downlink Control Channel (PDCCH) channel.

In one embodiment, the first-type channel is a PDCCH.

In one embodiment, the meaning of the phrase of monitoring a first-type channel includes: monitoring a DCI format transmitted in the first-type channel.

In one embodiment, the meaning of the phrase of monitoring a first-type channel includes: monitoring a PDCCH candidate to judge whether the first-type channel is transmitted.

In one embodiment, the meaning of the phrase of monitoring a first-type channel includes: monitoring a PDCCH candidate to judge whether the first-type channel is transmitted in a PDCCH candidate.

In one embodiment, the meaning of the phrase of monitoring a first-type channel includes: monitoring a PDCCH candidate to judge whether a DCI format is detected in a PDCCH candidate.

In one embodiment, the meaning of the phrase of monitoring a first-type channel includes: monitoring a PDCCH candidate to judge whether a DCI format being transmitted in the first-type channel is detected in a PDCCH candidate.

In one embodiment, the monitoring refers to blind decoding, and the meaning of the phrase of monitoring a first-type channel includes: executing decoding operation; if a decoding is determined as correct according to a Cyclic Redundancy Check (CRC), judging that a DCI format being transmitted in the first-type channel is detected; otherwise judging that a DCI format is not detected.

In one embodiment, the monitoring refers to blind decoding, and the meaning of the phrase of monitoring a first-type channel includes: executing a decoding operation in a PDCCH candidate; if decoding is determined as correct according to a CRC in a PDCCH candidate, judging that a DCI format being transmitted in the first-type channel is detected in the a PDCCH candidate; otherwise judging that a DCI format is not detected in the a PDCCH candidate.

In one embodiment, the monitoring refers to coherent detecting, and the meaning of the phrase of monitoring a first-type channel includes: executing a coherent reception and measuring energy of a signal obtained after the coherent reception; if the energy of the signal acquired after the coherent reception is greater than a first given threshold, judging that a DCI format being transmitted in the first-type channel is detected; otherwise judging that a DCI format is not detected.

In one embodiment, the monitoring refers to energy detecting, and the meaning of the phrase of monitoring a first-type channel includes: sensing energy of a radio signal and averaging it to obtain received energy; if the received energy is greater than a second given threshold, judging that a DCI format being transmitted in the first-type channel is detected; otherwise judging that a DCI format is not detected.

In one embodiment, the meaning of the phrase of monitoring a first-type channel includes: determining whether the first-type channel is transmitted according to a CRC, and not determining whether the first-type channel is transmitted before judging whether decoding is correct according to a CRC.

In one embodiment, the meaning of the phrase of monitoring a first-type channel includes: determining whether there exist DCI being transmitted in the first-type channel according to a CRC, and not determining whether there exists DCI being transmitted in the first-type channel before judging whether decoding is correct according to a CRC.

In one embodiment, the meaning of the phrase of monitoring a first-type channel includes: determining whether the first-type channel is transmitted according to a coherent detection; and not determining whether the first-type channel is transmitted before a coherent detection.

In one embodiment, the meaning of the phrase of monitoring a first-type channel includes: determining whether there exists DCI being transmitted in the first-type channel according to a coherent detection; and not determining whether exists DCI being transmitted in the first-type channel before a coherent detection.

In one embodiment, the meaning of the phrase of monitoring a first-type channel includes: determining whether the first-type channel is transmitted according to an energy detection; and not determining whether the first-type channel is transmitted before an energy detection.

In one embodiment, the meaning of the phrase of monitoring a first-type channel includes: determining whether there exists DCI being transmitted in the first-type channel according to an energy detection; and not determining whether exists DCI being transmitted in the first-type channel before an energy detection.

Embodiment 2

Figure 2:
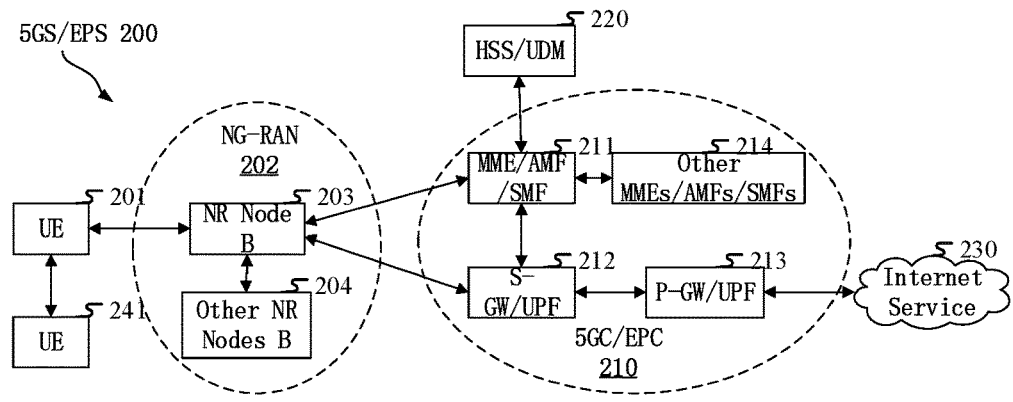
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the gNB 203.

In one embodiment, the third node in the present disclosure comprises the gNB 204.

In one embodiment, a radio link between the UE 201 and the gNB 203 is a cellular network link.

In one embodiment, a transmitter of the first signaling in the present disclosure comprises the gNB 203.

In one embodiment, a receiver of the first signaling in the present disclosure comprises the UE 201.

In one embodiment, a transmitter of the first-type channel in the present disclosure comprises the gNB 203.

In one embodiment, a receiver of the first-type channel in the present disclosure comprises the UE 201.

Embodiment 3

Figure 3:
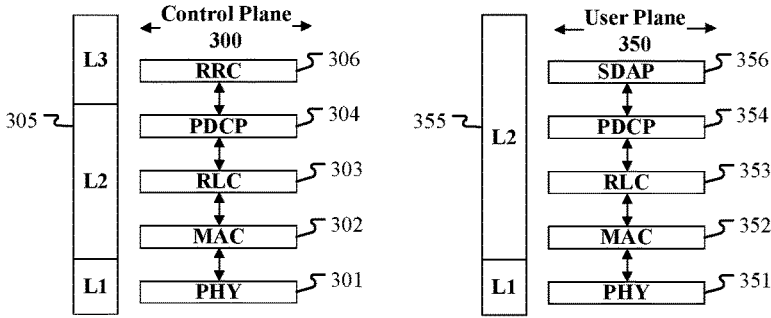
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or a RSU in V2X) and a second communication node (gNB, UE or a RSU in V2X), or between two UEs is represented by three layers, which are a layer 1, a layer 2 and a layer 3, respectively. The L1 is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises L1 and L2. In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the PHY 301 or the PHY 351.

In one embodiment, the first signaling is generated by the MAC sublayer 302 or the MAC sublayer 352.

In one embodiment, the first-type channel is generated by the PHY 301 or the PHY 351.

Embodiment 4

Figure 4:
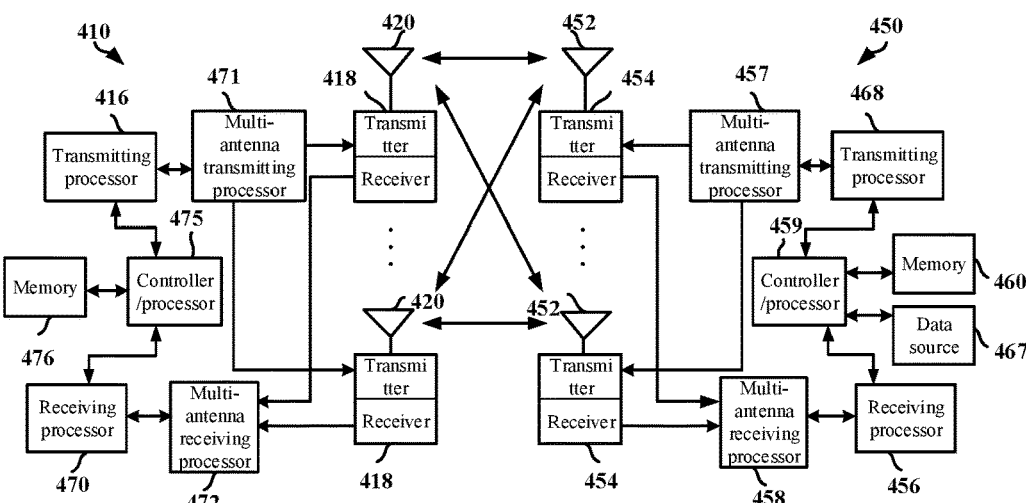
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling; and monitors the first-type channel in the first resource pool set.

In one embodiment, the second communication device 450 comprises a memory that stores a computer readable instruction program. The computer readable instruction program generates an action when executed by at least one processor. The action includes: receiving the first signaling; and monitoring the first-type channel in the first resource pool set.

In one embodiment, the first communication device 410 comprises at least one processor and at least one memory.

The at least one memory comprises computer program codes; the at least one memory and the computer program codes are configured to be used in collaboration with the at least one processor. The first communication device 410 at least: transmits the first signaling; after the target time, transmits the first-type channel in the target resource pool subset, or, after the target time, drops transmitting the first-type channel in the target resource pool subset.

In one embodiment, the first communication device 410 comprises a memory that stores a computer readable instruction program. The computer readable instruction program generates an action when executed by at least one processor. The action includes: transmitting the first signaling; after the target time, transmitting the first-type channel in the target resource pool subset, or, after the target time, dropping transmitting the first-type channel in the target resource pool subset.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first-type channel in the target resource pool subset, or, drops transmitting the first-type channel in the target resource pool subset.

In one embodiment, the first communication device 410 comprises a memory that stores a computer readable instruction program. The computer readable instruction program generates an action when executed by at least one processor. The action includes: transmitting the first-type channel in the target resource pool subset, or, dropping transmitting the first-type channel in the target resource pool subset.

In one embodiment, the first node comprises the second communication device 450 in the present disclosure.

In one embodiment, the second node in the present disclosure comprises the first communication device 410.

In one embodiment, the third node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first signaling; at least one of the antenna 420, the transmitter 418, the transmitting processor 416, the multi-antenna transmitting processor 471, the controller/processor 475, or the memory 476 is used to transmit the first signaling.

In one embodiment, at least one of the antenna 452, the receiver 454, the receiving processor 456, the multi-antenna receiving processor 458, the controller/processor 459, the memory 460, or the data source 467 is used to monitor the first-type channel in the first resource pool set; at least one of the antenna 420, the receiver 418, the receiving processor 416, the multi-antenna transmitting processor 471, the controller/processor 475, or the memory 476 is used to transmit the first-type channel in the target resource pool subset.

In one embodiment, at least one of the antenna 420, the receiver 418, the receiving processor 470, the multi-antenna receiving processor 472, the controller/processor 475, or the memory 476 is used to receive the second signal in the second resource pool; at least one of the antenna 452, the transmitter 454, the transmitting processor 468, the multi-antenna transmitting processor 457, the controller/processor 459 or the memory 460 is used to transmit the second signal in the second resource pool.

In one embodiment, at least one of the antenna 452, the receiver 454, the receiving processor 456, the multi-antenna receiving processor 458, the controller/processor 459, the memory 460, or the data source 467 is used to receive the first signal; at least one of the antenna 420, the transmitter 418, the transmitting processor 416, the multi-antenna transmitting processor 471, the controller/processor 475, or the memory 476 is used to transmit the first signal.

In one embodiment, at least one of the antenna 420, the receiver 418, the receiving processor 470, the multi-antenna receiving processor 472, the controller/processor 475 or the memory 476 is used to receive the third signal; at least one of the antenna 452, the transmitter 454, the transmitting processor 468, the multi-antenna transmitting processor 457, the controller/processor 459 or the memory 460 is used to transmit the third signal.

In one embodiment, at least one of the antenna 452, the receiver 454, the receiving processor 456, the multi-antenna receiving processor 458, the controller/processor 459, the memory 460, or the data source 467 is used to receive the first information block; at least one of the antenna 420, the transmitter 418, the transmitting processor 416, the multi-antenna transmitting processor 471, the controller/processor 475, or the memory 476 is used to transmit the first information block.

Embodiment 5

Figure 5:
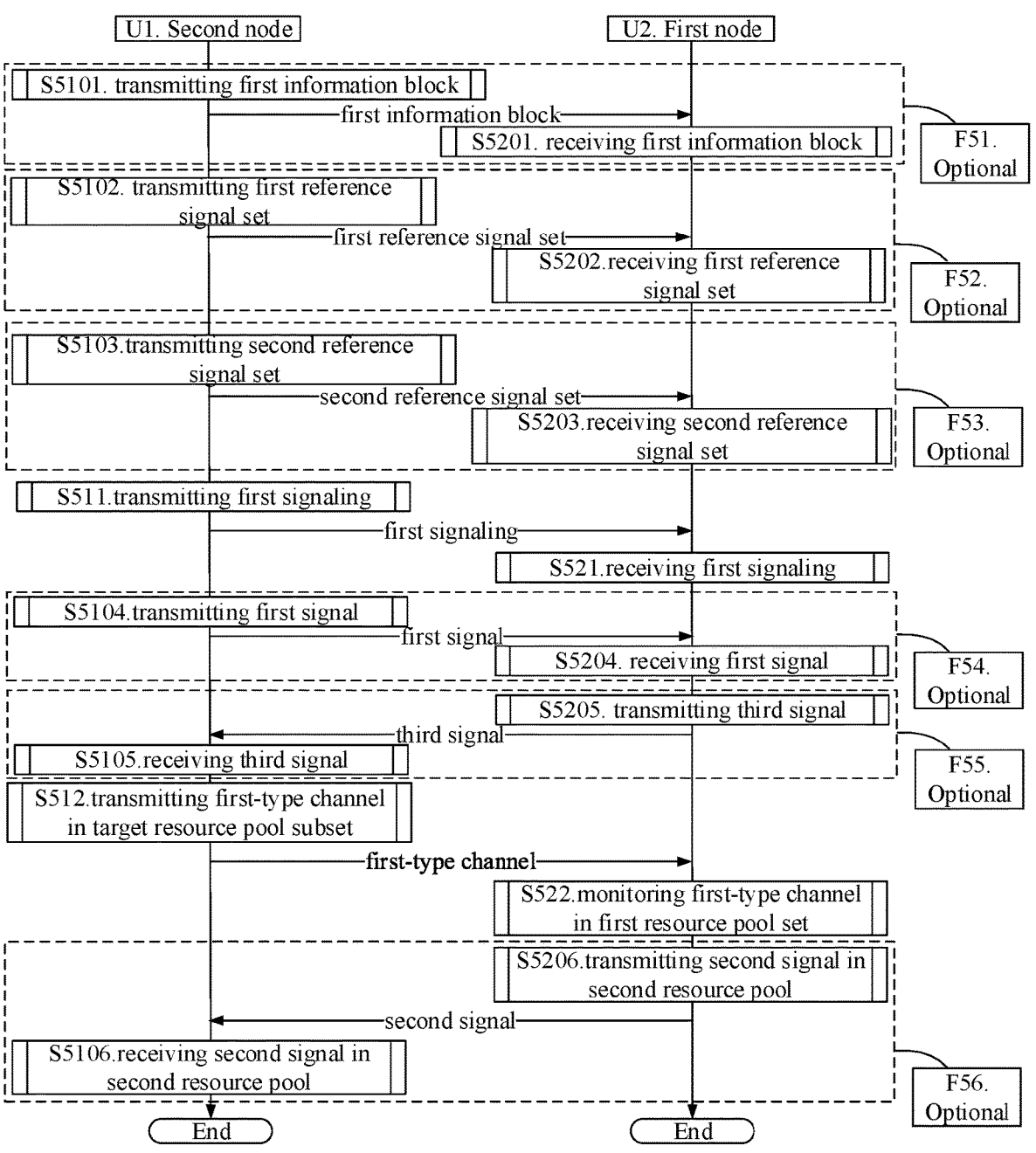
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a second node U1 and a first node U2 are communication nodes transmitted via an air interface. In FIG. 5, steps in F51 to F56 are respectively optional.

The second node U1 transmits a first information block in step S5101; transmits a first reference signal set in step S5102; transmits a second reference signal set in step S5103; transmits a first signaling in step S511; transmits a first signal in step S5104; receives a third signal in step S5105; transmits a first-type channel in a target resource pool subset in step S512; and receives a second signal in a second resource pool in step S5106.

The first node U2 receives a first information block in step S5201; receives a first reference signal set in step S5202; receives a second reference signal set in step S5203; receives a first signaling in step S521; receives a first signal in step S5204; transmits a third signal in step S5205; monitors a first-type channel in a first resource pool set in step S522; and transmits a second signal in a second resource pool in step S5206.

In embodiment 5, the first signaling is used to determine a target time; the first signaling is used by the first node U2 to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node U2 assumes same QCL parameters as the first reference signal; the first reference signal belongs to a first reference signal set or a second reference signal set, and the first reference signal set and the second reference signal set respectively comprise at least one reference signal; when the first reference signal belongs to the first reference signal set, the target resource pool subset is the first resource pool subset; and when the first reference signal belongs to the second reference signal set, the target resource pool subset is the second resource pool subset.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the second node U1 is a serving cell maintenance base station of the first node U2.

In one embodiment, the first signaling is used by the first node U2 to determine the target time.

In one embodiment, the first signaling is used by the second node U1 to determine the target time.

In one embodiment, a said first-type channel transmitted in the first resource pool set is earlier than the first signaling in time domain.

In one embodiment, a said first-type channel transmitted in the first resource pool set is later than the first signaling in time domain.

In one embodiment, there exists a reference signal in the first reference signal set being later than the first signaling in time domain.

In one embodiment, there exists a reference signal in the second reference signal set being later than the first signaling in time domain.

In one embodiment, there exists a reference signal in the first reference signal set being later than a said first-type channel transmitted in the first resource pool set in time domain.

In one embodiment, there exists a reference signal in the second reference signal set being later than a said first-type channel transmitted in the first resource pool set in time domain.

In one embodiment, there exists a reference signal in the first reference signal set being later than a reference signal in the second reference signal set in time domain.

In one embodiment, the second node U1 transmits the first-type channel in the target resource pool subset after the target time.

In one embodiment, whether the first reference signal belongs to the first reference signal set or the second reference signal set, the second node transmits the first-type channel in the target resource pool subset after the target time.

In one embodiment, the method in a second node for wireless communications comprises:

transmitting the first-type channel in a first-type resource pool in the first resource pool set before the target time.

In one embodiment, the method in a second node for wireless communications comprises:

transmitting the first-type channel in a first-type resource pool in the first resource pool set not belonging to the target resource pool subset after the target time.

In one embodiment, the meaning of the phrase of transmitting a first-type channel includes: transmitting a DCI format in the first-type channel.

In one embodiment, the meaning of the phrase of transmitting a first-type channel includes: transmitting a DCI format carried by the first-type channel.

In one embodiment, the meaning of the phrase of transmitting a first-type channel includes: transmitting the first-type channel in a PDCCH candidate.

In one embodiment, the meaning of the phrase of transmitting a first-type channel includes: transmitting a DCI format carried by the first-type channel in a PDCCH candidate.

In one embodiment, after the target time, the first reference signal is used by the first node U2 to determine a spatial relation of the first-type channel transmitted in the target resource pool subset.

In one embodiment, after the target time, the first reference signal is used by the second node U1 to determine a spatial relation of the first-type channel transmitted in the target resource pool subset.

In one embodiment, the spatial relation comprises a TCI state.

In one embodiment, the spatial relation comprises a QCL assumption.

In one embodiment, the spatial relation comprises a QCL parameter.

In one embodiment, the spatial relation comprises a spatial-domain filter.

In one embodiment, the spatial relation comprises a spatial-domain transmission filter.

In one embodiment, the spatial relation comprises a spatial-domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the meaning of the phrase of the first reference signal being used to determine a spatial relation of the first-type channel transmitted in the target resource pool subset includes: the first reference signal is used to determine a spatial relation of the first-type channel transmitted in each resource pool in the target resource pool subset.

In one embodiment, before the target time, the second reference signal is used by the second node U1 to determine a spatial relation of the first-type channel transmitted in the first resource pool.

In one embodiment, before the target time, the second reference signal is used by the first node U2 to determine a spatial relation of the first-type channel transmitted in the first resource pool.

In one embodiment, after the target time, the second reference signal is used by the second node U1 to determine a spatial relation of the first-type channel transmitted in the first resource pool.

In one embodiment, after the target time, the second reference signal is used by the first node U2 to determine a spatial relation of the first-type channel transmitted in the first resource pool.

In one embodiment, a given first-type resource pool is any first-type resource pool in the first resource pool set; before the target time, a second reference signal is used to determine the spatial relation of the first-type channel transmitted in the given first-type resource pool.

In one embodiment, a given first-type resource pool is any first-type resource pool in the first resource pool set not belonging to the target resource pool subset; before the target time and after the target time, a same reference signal is used to determine a spatial relation of the first-type channel transmitted in the given first-type resource pool.

In one embodiment, the first signaling is transmitted on a downlink physical layer control channel (i.e., a downlink channel only capable of bearing a physical layer signaling).

In one embodiment, the first signaling is transmitted on a PDCCH.

In one embodiment, steps in box F51 in FIG. 5 exist; the first information block is used by the first node U2 to determine the first reference signal set and the second reference signal set.

In one embodiment, the first information block is transmitted on a Physical Downlink Shared Channel (PDSCH).

In one embodiment, steps in box F52 in FIG. 5 exist.

In one embodiment, steps in box F53 in FIG. 5 exist.

In one embodiment, steps in box F54 in FIG. 5 exist; the first signaling is used by the first node U2 to determine scheduling information of the first signal.

In one embodiment, the first signal is transmitted on a downlink physical layer data channel (i.e., a downlink channel capable of bearing physical layer data).

In one embodiment, the first signal is transmitted on a PDSCH.

In one embodiment, steps in the box F55 in FIG. 5 exist; the third signal is used by the second node U1 to determine that the first signaling is correctly received, time-domain resources occupied by the third signal are used by the first node U2 to determine the target time, and the first signaling is used by the first node U2 to determine time-domain resources occupied by the third signal.

In one embodiment, the third signal is transmitted on a Physical Uplink Control Channel (PUCCH).

In one embodiment, the third signal is transmitted on a Physical Uplink Shared Channel (PUSCH).

In one embodiment, steps in box F54 in FIG. 5 exist, and steps in box F55 do not exist; the first node U2 executes only the behavior of receiving the first signal in the behavior of receiving the first signal and the behavior of transmitting the third signal.

In one embodiment, steps in box F54 in FIG. 5 do not exist, and steps in box F55 exist; the first node U2 executes only the behavior of transmitting the third signal in the behavior of receiving the first signal and the behavior of transmitting the third signal.

In one embodiment, steps in box F54 and box F55 in FIG. 5 exist; and the first node U2 receives the first signal and transmits the third signal.

In one embodiment, steps in the box marked by F56 in FIG. 5 exist; the second resource pool is a second-type resource pool in a second resource pool set, and the second resource pool set comprises more than one second-type resource pool; when the first reference signal belongs to the first reference signal set, the first reference signal is used by the first node U2 to determine a spatial-domain filter of the second signal; when the first reference signal belongs to the second reference signal set, whether the first reference signal is used by the first node U2 to determine whether a spatial-domain filter of the second signal is related to whether the second resource pool belongs to a third resource pool subset; the third resource pool subset comprises at least one second-type resource pool in the second resource pool set.

In one embodiment, the second node receives the second signal in the second resource pool.

In one embodiment, whether the first reference signal belongs to the first reference signal set or the second reference signal set, the first node U1 receives the second signal in the second resource pool.

In one embodiment, whether the second resource pool belongs to the third resource pool subset, the second node receives the second signal in the second resource pool.

In one embodiment, the second signal is transmitted on a PUCCH.

In one embodiment, the second signal is transmitted on a PUSCH.

Embodiment 6

Figure 6:
FIG. 6 illustrates a flowchart of wireless communications according to one embodiment of the present disclosure.

Embodiment 6 illustrates a flowchart of wireless transmission according to one embodiment in the present disclosure, as shown in FIG. 6. In FIG. 6, a second node U3, a first node U4 and a third node U5 are communication nodes that transmit in pairs through an air interface. In FIG. 6, steps in F61 to F612 are respectively optional; and steps in blocks F64 and F65 cannot exist at the same time.

The second node U3 transmits a first information block in step S6301; transmits a first reference signal set in step S6302; transmits a second information block in step S6303; transmits a first signaling in step S631; transmits a first signal in step S6304; receives a third signal in step S6305; transmits a first-type channel in a target resource pool subset in step S6306; and receives a second signal in a second resource pool in step S6307.

The first node U4 receives a first information block in step S6401; receives a first reference signal set in step S6402; receives a second reference signal set in step S6403; transmits a second information block in step S6404; receives a first signaling in step S641; receives a first signal in step S6405; transmits a third signal in step S6406; monitors a first-type channel in a first resource pool set in step S642; and transmits a second signal in a second resource pool in step S6407.

The third node U5 transmits a second reference signal set in step S6501; receives a second information block in step S6502; receives a second information block in step S6503; transmits a first-type channel in a target resource pool subset in step S6504; and receives a second signal in a second resource pool in step S6505.

In embodiment 6, the first signaling is used by the first node U4 to determine a target time; the first resource pool set comprises more than one first-type resource pool; the first signaling is used by the first node U4 to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node U4 assumes same QCL parameters as the first reference signal; the first reference signal belongs to a first reference signal set or a second reference signal set, and the first reference signal set and the second reference signal set respectively comprise at least one reference signal; when the first reference signal belongs to the first reference signal set, the target resource pool subset is the first resource pool subset; and when the first reference signal belongs to the second reference signal set, the target resource pool subset is the second resource pool subset.

In one embodiment, the first node U4 is the first node in the present disclosure.

In one embodiment, the second node U3 is the second node in the present disclosure.

In one embodiment, the third node U5 is the third node in the present disclosure.

In one embodiment, an air interface between the third node U5 and the first node U4 comprises a radio interface between a base station and a UE.

In one embodiment, an air interface between the third node U5 and the first node U4 comprises a radio interface between UEs.

In one embodiment, steps in block F68 exist, and the second node U3 transmits the first-type channel in the target resource pool subset after the target time.

In one embodiment, steps in block F68 do not exist, and the second node U3 drops transmitting the first-type channel in the target resource pool subset after the target time.

In one embodiment, whether the first reference signal belongs to the first reference signal set or the second reference signal set is used by the second node U3 to determine whether the first-type channel is transmitted in the target resource pool subset after the target time.

In one embodiment, when the first reference signal belongs to the first reference signal set, the second node U3 transmits the first-type channel in the target resource pool subset after the target time; when the first reference signal belongs to the second reference signal set, the second node U3 drops transmitting the first-type channel in the target resource pool subset after the target time.

In one embodiment, steps in box F69 in FIG. 6 exist, and the third node U5 transmits the first-type channel in the target resource pool subset.

In one embodiment, steps in box F69 in FIG. 6 do not exist, and the third node U5 drops transmitting the first-type channel in the target resource pool subset.

In one embodiment, the second information block is used by the third node U5 to determine whether the first-type channel is transmitted in the target resource pool subset.

In one embodiment, the second information block is used by the third node U5 to determine whether the first-type channel is transmitted in the target resource pool subset after the target time.

In one embodiment, the second information block indicates whether the first-type channel is transmitted in the target resource pool subset.

In one embodiment, when the third node U5 receives the second information block, the third node U5 transmits the first-type channel in the target resource pool subset; and when the third node U5 does not receive the second information block, the third node U5 drops transmitting the first-type channel in the target resource pool subset.

In one embodiment, when the third node U5 receives the second information block, the third node U5 transmits the first-type channel in the target resource pool subset after a target time; and when the third node U5 does not receive the second information block, the third node U5 drops transmitting the first-type channel in the target resource pool subset.

In one embodiment, steps in box F68 and steps in box F69 in FIG. 6 cannot exist at the same time.

In one embodiment, steps in box F68 exist and steps in box F69 do not exist in FIG. 6.

In one embodiment, steps in box F68 do not exist and steps in box F69 exist in FIG. 6.

In one embodiment, the first reference signal is used by the third node U5 to determine a spatial relation of the first-type channel transmitted in the target resource pool subset.

In one embodiment, when the second information block is used to determine that the first-type channel is transmitted in the target resource pool subset, the second information block indicates the first reference signal.

In one embodiment, when the second information block is used to determine that the first-type channel is transmitted in the target resource pool subset, the second information block indicates the target resource pool subset.

In one embodiment, when the second information block is used to determine that the first-type channel is transmitted in the target resource pool subset; the second information block indicates the target time.

In one embodiment, steps in box F64 exist and steps in box F65 do not exist in FIG. 6; and the second information block is transmitted via an air interface.

In one embodiment, steps in box F64 exist and steps in box F65 exist in FIG. 6; and the second information block is transmitted via a backhaul.

In one embodiment, steps in box F61 in FIG. 6 exist.

In one embodiment, steps in box F62 in FIG. 6 exist.

In one embodiment, steps in box F63 in FIG. 6 exist.

In one embodiment, steps in box F66 in FIG. 6 exist.

In one embodiment, steps in box F67 in FIG. 6 exist.

In one embodiment, steps in box F610 in FIG. 6 exist.

In one embodiment, steps in box F611 in FIG. 6 do not exist; and the second node U3 receives the second signal in the second resource pool.

In one embodiment, steps in box F611 in FIG. 6 do not exist; and the second node U3 drops receiving the second signal in the second resource pool.

In one embodiment, whether the first reference signal belongs to the first reference signal set or the second reference signal set is used by the second node U3 to determine whether the second signal is received in the second resource pool.

In one embodiment, whether the second resource pool belongs to the third resource pool subset is used by the second node U3 to determine whether the second signal is received in the second resource pool.

In one embodiment, whether the first reference signal belongs to the first reference signal set or the second reference signal set and whether the second resource pool belongs to the third resource pool subset are used together by the second node U3 to determine whether the second signal is received in the second resource pool.

In one embodiment, when the first reference signal belongs to the first reference signal set, the second node U3 receives the second signal in the second resource pool.

In one embodiment, when the first reference signal belongs to the second reference signal set, whether the second resource pool belongs to the third resource pool subset is used by the second node U3 to determine whether the second signal is received in the second resource pool.

In one embodiment, when the first reference signal belongs to the second reference signal set and the second resource pool belongs to the third resource pool subset, the second node U3 drops receiving the second signal in the second resource pool.

In one embodiment, when the first reference signal belongs to the second reference signal set and the second resource pool does not belong to the third resource pool subset, the second node U3 receives the second signal in the second resource pool.

In one embodiment, steps in box F612 in FIG. 6 exist; and the third node U5 receives the second signal in the second resource pool.

In one embodiment, steps in box F612 in FIG. 612 do not exist; and the third node U5 drops receiving the second signal in the second resource pool.

In one embodiment, when and only when the first reference signal belongs to the second reference signal set and the second resource pool belongs to the third resource pool subset, the third node U5 receives the second signal in the second resource pool.

In one embodiment, when the second information block is used to determine that the first-type channel is transmitted in the target resource pool subset, the third node U5 receives the second signal in the second resource pool; otherwise, the third node U5 drops receiving the second signal in the second resource pool.

In one embodiment, when the third node U5 transmits the first-type channel in the target resource pool subset, the third node U5 receives the second signal in the second resource pool; when the third node U5 drops transmitting the first-type channel in the target resource pool subset, the third node U5 drops receiving the second signal in the second resource pool.

In one embodiment, steps in box F611 and steps in box F612 in FIG. 6 cannot exist at the same time.

In one embodiment, steps in box F610 and box F611 in FIG. 6 exist, and steps in block F612 do not exist.

In one embodiment, steps in box F610 and box F612 in FIG. 6 exist, and steps in block F611 do not exist.

Embodiment 7

Embodiment 7 illustrates a schematic diagram of a first resource pool set according to one embodiment of the present disclosure, as shown in FIG. 7. In embodiment 7, the first resource pool set comprises more than one first-type resource pool. In FIG. 7, indexes of first-type resource pools in the first resource pool set are #0, #1, . . . ; x and y are respectively non-negative integers less than a number of first-type resource pools comprised in the first resource pool set, and x is not equal to y.

In one embodiment, a number of first-type resource pools comprised in the first resource pool set is not greater than 1024.

In one embodiment, any first-type resource pool in the first resource pool set comprises more than one Resource Element (RE) in time-frequency domain.

In one embodiment, an RE occupies a symbol in time domain, and a subcarrier in frequency domain.

In one embodiment, the symbol is an Orthogonal Frequency Division Multiplexing (OFDM) symbol.

In one embodiment, the symbol is a Single Carrier-Frequency Division Multiple Access (SC-FDMA) symbol.

In one embodiment, the symbol is a Discrete Fourier Transform Spread OFDM (DFT-S-OFDM) symbol.

In one embodiment, any first-type resource pool in the first resource pool set occupies at least one symbol in time domain.

In one embodiment, any first-type resource pool in the first resource pool set occupies at least one Physical Resource block (PRB) in frequency domain.

In one embodiment, any first-type resource pool in the first resource pool set comprises time-frequency resources.

In one embodiment, any first-type resource pool in the first resource pool set comprises time-frequency resources code-domain resources.

In one embodiment, the code-domain resources comprise one or more of a pseudo-random sequence, a low Peak-to-Average Power Ratio (PAPR) sequence, a cyclic shift or an Orthogonal Cover Code (OCC).

In one embodiment, the first resource pool set comprises a Control REsource SET (CORESET).

In one embodiment, the first resource pool set comprises a search space set.

In one embodiment, a first-type resource pool in the first resource pool set comprises a CORESET.

In one embodiment, a first-type resource pool in the first resource pool set comprises a search space set.

In one embodiment, a first-type resource pool in the first resource pool set is a CORESET.

In one embodiment, a first-type resource pool in the first resource pool set is a search space set.

In one embodiment, any first-type resource pool in the first resource pool set comprises a CORESET.

In one embodiment, any first-type resource pool in the first resource pool set comprises a search space set.

In one embodiment, any first-type resource pool in the first resource pool set is a CORESET.

In one embodiment, any first-type resource pool in the first resource pool set is a search space set.

In one embodiment, any first-type resource pool in the first resource pool set comprises a CORESET or a search space set.

In one embodiment, any first-type resource pool in the first resource pool set comprises a plurality of PDCCH candidates.

In one embodiment, all first-type resource pools in the first resource pool set belong to a same carrier.

In one embodiment, all first-type resource pools in the first resource pool belong to a same BandWidth Part (BWP).

In one embodiment, all first-type resource pools in the first resource pool belong to a same cell.

In one embodiment, there exist two first-type resource pools in the first resource pool set belonging to different carriers.

In one embodiment, there exist two first-type resource pools in the first resource pool set belonging to different BWPs.

In one embodiment, there exist two first-type resource pools in the first resource pool set belonging to different cells.

In one embodiment, a cell to which any first-type resource pool in the first resource pool set belongs belongs to a first cell set; the first cell set comprises at least one cell, and the first cell set is configured by a RRC signaling.

In one embodiment, any first-type resource pool in the first resource pool set occurs a plurality of times in time domain.

In one embodiment, there exists a first-type resource pool in the first resource pool set occurs a plurality of times in time domain.

In one embodiment, there exists a first-type resource pool in the first resource pool set occurs only once in time domain.

In one embodiment, any first-type resource pool in the first resource pool set occurs periodically in time domain.

In one embodiment, there exists a first-type resource pool in the first resource pool set occurring periodically in time domain.

In one embodiment, any first-type resource pool in the first resource pool set is identified by a second-type index, and second-type indexes corresponding to any two first-type resource pools in the first resource pool set are unequal; and the second-type index is a non-negative integer.

In one subembodiment of the above embodiment, the second-type index comprises a ControlResourceSetId.

In one subembodiment of the above embodiment, the second-type index comprises a SearchSpaceId.

In one embodiment, the first resource pool subset consists of one or a plurality of first-type resource pools in the first resource pool set.

In one embodiment, the first resource pool subset comprises only a first-type resource pool in the first resource pool set.

In one embodiment, the first resource pool subset comprises a plurality of first-type resource pools in the first resource pool set.

In one embodiment, the first resource pool subset comprises all first-type resource pools in the first resource pool set.

In one embodiment, the first resource pool subset comprises only partial first-type resource pools in the first resource pool set.

In one embodiment, the first resource pool subset is the first resource pool set.

In one embodiment, the first resource pool subset comprises a CORESET indexed as 0.

In one embodiment, a resource pool in the first resource pool subset is associated with a CORESET indexed as 0.

In one embodiment, a resource pool in the first resource pool subset is a CORESET indexed as 0.

In one embodiment, a search space set to which a resource pool in the first resource pool subset belongs is associated with a CORESET indexed as 0.

In one embodiment, a resource pool in the first resource pool subset is associated with a CORESET not indexed as 0.

In one embodiment, the first resource pool subset comprises a Common Search Space (CSS).

In one embodiment, a resource pool in the first resource pool subset is a CSS.

In one embodiment, a search space set to which a resource pool in the first resource pool subset belongs is a CSS.

In one embodiment, the first resource pool subset comprises a UE-specific Search Space (USS).

In one embodiment, a resource pool in the first resource pool subset is a USS.

In one embodiment, a search space set to which a resource pool in the first resource pool subset belongs is a USS.

In one embodiment, the first resource pool subset does not comprise a CSS.

In one embodiment, a search space set to which any resource pool in the first resource pool subset belongs is a USS.

In one embodiment, the first resource pool subset does not comprise a USS.

In one embodiment, a search space set to which any resource pool in the first resource pool subset belongs is a CSS.

In one embodiment, the second resource pool subset consists of one or a plurality of first-type resource pools in the first resource pool set.

In one embodiment, the second resource pool subset comprises only a first-type resource pool in the first resource pool set.

In one embodiment, the second resource pool subset comprises a plurality of first-type resource pools in the first resource pool set.

In one embodiment, the second resource pool subset comprises all first-type resource pools in the first resource pool set.

In one embodiment, the second resource pool subset comprises only partial first-type resource pools in the first resource pool set.

In one embodiment, the second resource pool subset is the first resource pool set.

In one embodiment, the second resource pool subset does not comprise a CORESET indexed as 0.

In one embodiment, a resource pool in the second resource pool subset is associated with a CORESET indexed as 0.

In one embodiment, a resource pool in the second resource pool subset is associated with a CORESET not indexed as 0.

In one embodiment, any resource pool in the second resource pool subset is associated with a CORESET not indexed as 0.

In one embodiment, the second resource pool subset comprises a CSS.

In one embodiment, the second resource pool subset comprises a USS.

In one embodiment, the second resource pool subset does not comprise a CSS.

In one embodiment, a search space set to which any resource pool in the second resource pool subset belongs is a USS.

In one embodiment, the second resource pool subset does not comprise a USS.

In one embodiment, a search space set to which any resource pool in the second resource pool subset belongs is a CSS.

In one embodiment, there exists a first-type resource pool in the first resource pool subset not belonging to the second resource pool subset.

In one embodiment, any first-type resource pool in the second resource pool subset belongs to the first resource pool subset.

In one embodiment, the first resource pool subset is the first resource pool set, and the second resource pool subset consists of partial first-type resource pools in the first resource pool set.

In one embodiment, there exists a first-type resource pool in the second resource pool subset not belonging to the first resource pool subset.

In one embodiment, any first-type resource pool in the first resource pool subset belongs to the second resource pool subset.

In one embodiment, there exists no resource pool in the first resource pool set belonging to both the first resource pool subset and the second resource pool subset at the same time.

In one embodiment, a CORESET associated with any resource pool in the first resource pool subset is not configured with a first higher-layer parameter or is configured with a first higher-layer parameter equal to a first value; a CORESET associated with any resource pool in the second resource pool subset is configured with a first higher-layer parameter equal to a second value; the first value and the second value are respectively non-negative integers, and the first value is not equal to the second value.

In one embodiment, any resource pool in the first resource pool subset is not configured with a first higher-layer parameter or is configured with a first higher-layer parameter equal to a first value; any resource pool in the second resource pool subset is configured with a first higher-layer parameter equal to a second value; the first value and the second value are respectively non-negative integers, and the first value is not equal to the second value.

In one embodiment, the first higher-layer parameter comprises contents of coresetPoolIndex-r16.

In one embodiment, the first higher-layer parameter is coresetPoolIndex-r16.

In one embodiment, a name of the first higher-layer parameter comprises a coresetPoolIndex.

In one embodiment, the first value is equal to 0 and the second value is equal to 1.

Embodiment 8

Embodiment 8 illustrates a schematic diagram of a first node monitoring a first-type channel in a given resource pool according to one embodiment of the present disclosure, as shown in FIG. 8. In embodiment 8, for the first-type channel monitoring performed in the given resource pool, the first node assumes same QCL parameters as a given reference signal; the given resource pool is any first-type resource pool or the first resource pool in the target resource pool subset, and the given reference signal is the first reference signal or the second reference signal.

In one embodiment, the given resource pool is any first-type resource pool in the target resource pool subset, and the given reference signal is the first reference signal.

In one embodiment, the given resource pool is the first resource pool, and the given reference signal is the second reference signal.

In one embodiment, the QCL refers to Quasi-Co-Located.

In one embodiment, the QCL refers to Quasi-Co-Location.

In one embodiment, the QCL comprises a QCL Type-A.

In one embodiment, the QCL comprises a QCL Type-B.

In one embodiment, the QCL comprises a QCL Type-C.

In one embodiment, the QCL comprises a QCL Type-D.

In one embodiment, the QCL parameters comprise one or more of delay spread, Doppler spread, Doppler shift, average delay or Spatial Rx parameter.

In one embodiment, the meaning of the phrase of for the first-type channel monitoring performed in the given resource pool, the first node assumes same QCL parameters as a given reference signal includes: the first node assumes that DeModulation Reference Signals of the first-type channel transmitted in the given resource pool and the given reference signal are QCL.

In one embodiment, the meaning of the phrase of for the first-type channel monitoring performed in the given resource pool, the first node assumes same QCL parameters as a given reference signal includes: the first node assumes that DMRS of the first-type channel transmitted in the given resource pool and the given reference signal are QCL corresponding to QCL-TypeA and/or QCL-TypeD.

In one embodiment, the meaning of the phrase of for the first-type channel monitoring performed in the given resource pool, the first node assumes same QCL parameters as a given reference signal includes: the first node assumes that a transmitting antenna port of the first-type channel transmitted in the given resource pool and the given reference signal are QCL.

In one embodiment, the meaning of the phrase of for the first-type channel monitoring performed in the given resource pool, the first node assumes same QCL parameters as a given reference signal includes: the given reference signal and a third reference signal are QCL, and the first node assumes that DMRS of the first-type channel transmitted in the given resource pool and the third reference signal are QCL.

In one embodiment, the meaning of the phrase of for the first-type channel monitoring performed in the given resource pool, the first node assumes same QCL parameters as a given reference signal includes: the first node uses a same spatial-domain filter to receive the given reference signal and monitors the first-type channel in the given resource pool.

In one embodiment, the meaning of the phrase of for the first-type channel monitoring performed in the given resource pool, the first node assumes same QCL parameters as a given reference signal includes: the first node uses a same spatial-domain filter to transmit the given reference signal and monitors the first-type channel in the given resource pool.

In one embodiment, the meaning of the phrase of for the first-type channel monitoring performed in the given resource pool, the first node assumes same QCL parameters as a given reference signal includes: the given reference signal and a third reference signal are QCL, and the first node uses a same spatial-domain filter to receive the third reference signal and monitors the first-type channel in the given resource pool.

In one embodiment, the meaning of the phrase of for the first-type channel monitoring performed in the given resource pool, the first node assumes same QCL parameters as a given reference signal includes: large-scale properties of a channel that the given reference signal goes through can be used to infer large-scale properties of a channel that the first-type channel transmitted in the given resource pool goes through.

In one embodiment, the meaning of the phrase of for the first-type channel monitoring performed in the given resource pool, the first node assumes same QCL parameters as a given reference signal includes: the given reference signal and a third reference signal are QCL, and large-scale properties of a channel that the third reference signal goes through can be used to infer large-scale properties of a channel that the first-type channel transmitted in the given resource pool goes through.

In one embodiment, the large-scale properties comprise one or more of delay spread, Doppler spread, Doppler shift, average delay or Spatial Rx parameter.

In one embodiment, the third reference signal comprises an CSI-RS.

In one embodiment, the third reference signal comprises an SSB.

Embodiment 9

Embodiment 9 illustrates a schematic diagram of a first node monitoring a first-type channel in a first resource pool according to one embodiment of the present disclosure, as shown in FIG. 9. In embodiment 9, before the target time, for the first-type channel monitoring performed in the first resource pool, the first node assumes same QCL parameters as a second reference signal.

In one embodiment, the first resource pool is any first-type resource pool in the first resource pool set.

In one embodiment, the first resource pool is any first-type resource pool not belonging to the first resource pool subset in the first resource pool set.

In one embodiment, the first resource pool is any first-type resource pool not belonging to the second resource pool subset in the first resource pool set.

In one embodiment, the second reference signal comprises a CSI-RS.

In one embodiment, the second reference signal comprises an NZP CSI-RS.

In one embodiment, the second reference signal comprises CSI-RS resources.

In one embodiment, the second reference signal comprises an SSB.

In one embodiment, the second reference signal comprise SSB resources.

In one embodiment, the second reference signal comprises an SRS.

In one embodiment, the second reference signal comprises SRS resources.

In one embodiment, the second reference signal and the first reference signal are not QCL.

In one embodiment, the second reference signal and the first reference signal are not QCL corresponding to QCL-TypeD.

In one embodiment, the second reference signal and the first reference signal correspond to different reference signal indexes.

In one embodiment, the second reference signal belongs to one of the first reference signal set or the second reference signal set.

In one embodiment, the second reference signal belongs to neither the first reference signal set nor the second reference signal set.

In one embodiment, the target resource pool subset only comprises partial first-type resource pools in the first resource pool set, and the first resource pool is a first-type resource pool in the first resource pool set not belonging to the target resource pool subset; after the target time, for the first-type channel monitoring performed in the first resource pool, the first node assumes same QCL parameters as the second reference signal.

In one embodiment, the first resource pool is any first-type resource pool in the first resource pool set not belonging to the target resource pool subset.

Embodiment 10

Embodiment 10 illustrates a schematic diagram of a first node transmitting a second signal in a second resource pool according to one embodiment of the present disclosure, as shown in FIG. 10.

In one embodiment, a number of second-type resource pools comprised in the second resource pool set is not greater than 1024.

In one embodiment, any second-type resource pool in the second resource pool set comprises more than one RE in time-frequency domain.

In one embodiment, any second-type resource pool in the second resource pool set occupies at least one symbol in time domain.

In one embodiment, any second-type resource pool in the second resource pool set occupies at least one PRB in frequency domain.

In one embodiment, any second-type resource pool in the second resource pool set comprises time-frequency resources.

In one embodiment, any second-type resource pool in the second resource pool set comprises time-frequency resources and code-domain resources.

In one embodiment, the second resource pool set comprises PUCCH resources.

In one embodiment, a second-type resource pool in the second resource pool set comprises PUCCH resources.

In one embodiment, any second-type resource pool in the second resource pool set comprises PUCCH resources.

In one embodiment, any second-type resource pool in the second resource pool set is a PUCCH resource.

In one embodiment, the second resource pool set comprises SRS resources.

In one embodiment, a second-type resource pool in the second resource pool set comprises SRS resources.

In one embodiment, any second-type resource pool in the second resource pool set comprises SRS resources.

In one embodiment, all second-type resource pools in the second resource pool set belong to a same carrier.

In one embodiment, all second-type resource pools in the second resource pool set belong to a same BWP.

In one embodiment, all second-type resource pools in the second resource pool belong to a same cell.

In one embodiment, there exist two second-type resource pools in the second resource pool set belonging to different carriers.

In one embodiment, there exist two second-type resource pools in the second resource pool set belonging to different BWPs.

In one embodiment, there exist two second-type resource pools in the second resource pool set belonging to different cells.

In one embodiment, a cell to which any second-type resource pool in the second resource pool set belongs belongs to a second cell set; the second cell set comprises at least one cell, and the second cell set is configured by a RRC signaling.

In one embodiment, a start time of the second resource pool is not earlier than the target time.

In one embodiment, a start time of time-domain resources occupied by the second signal is not earlier than the target time.

In one embodiment, the second signal comprises a baseband signal.

In one embodiment, the second signal comprises a radio signal.

In one embodiment, the second signal comprises a radio-frequency signal.

In one embodiment, the second signal carries at least one of a Transport Block (TB), a Code Block (CB) or a Code Block Group (CBG).

In one embodiment, the second signal carries Uplink control information (UCI).

Embodiment 11

Embodiment 11 illustrates a schematic diagram of relations among a first reference signal, a second resource pool and a spatial-domain filter of a second signal according to one embodiment of the present disclosure, as shown in FIG. 11. In embodiment 11, when the first reference signal belongs to the first reference signal set, the first reference signal is used to determine a spatial-domain filter of the second signal; when the first reference signal belongs to the second reference signal set and the second resource pool belongs to the third resource pool subset, the first reference signal is used to determine a spatial-domain filter of the second signal; when the first reference signal belongs to the second reference signal set and the second resource pool does not belong to the third resource pool subset, a spatial-domain filter of the second signal is unrelated to the first reference signal.

In one embodiment, when the first reference signal belongs to the second reference signal set, whether a spatial-domain filter of the second signal is related to the first reference signal is related to whether the second resource pool belongs to the third resource pool subset.

In one embodiment, when the first reference signal is used to determine a spatial-domain filter of the second signal, a spatial-domain filter of the second signal is related to the first reference signal; and when the first reference signal is not used to determine a spatial-domain filter of the second signal, a spatial-domain filter of the second signal is unrelated to the first reference signal.

In one embodiment, when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to the third resource pool subset.

In one embodiment, when the first reference signal belongs to the second reference signal set and the second resource pool does not belong to the third resource pool subset, the second reference signal is used to determine a spatial-domain filter of the second signal.

In one embodiment, the third resource pool subset consists of one or a plurality of second-type resource pools in the second resource pool set.

In one embodiment, the third resource pool subset only comprises a second-type resource pool in the second resource pool set.

In one embodiment, the third resource pool subset only comprises partial second-type resource pools in the second resource pool set.

In one embodiment, the third resource pool subset comprises a plurality of second-type resource pools in the second resource pool set.

In one embodiment, there exists a second-type resource pool in the second resource pool set not belonging to the third resource pool subset.

In one embodiment, any second-type resource pool in the second resource pool set is configured with a first-type index, and a said first-type index is a non-negative integer; and a value of a first-type index corresponding to any second-type resource pool in the third resource pool subset is equal to a third value.

In one subembodiment of the above embodiment, there exists a value of a first-type index configured for a second-type resource pool in the second resource pool set being unequal to the third value.

In one embodiment, any second-type resource pool in the second resource pool set is identified by a third-type index, and the third-type index is a non-negative integer; third-type indexes corresponding to any two second-type resource pools in the second resource pool set are not equal.

In one subembodiment of the above embodiment, the third-type index comprises a PUCCH-ResourceId.

In one subembodiment of the above embodiment, the third-type index comprises an SRS-ResourceSetId.

In one subembodiment of the above embodiment, the third-type index comprises an SRS-ResourceId.

In one embodiment, a PUCCH format corresponding to any second-type resource pool in the third resource pool subset belongs to a first format set, and the first format set comprises at least one PUCCH format.

In one subembodiment of the above embodiment, there exists a PUCCH format corresponding to a second-type resource pool in the second resource pool set not belonging to the first format set.

In one embodiment, spatial relation information corresponding to any second-type resource pool in the third resource pool subset belongs to a first spatial relation information set; and the first spatial relation information set comprises at least one spatial relation information.

In one subembodiment of the above embodiment, there exists spatial relation information corresponding to a second-type resource pool in the second resource pool set not belonging to the first spatial relation information set.

In one embodiment, a time-domain behavior of any second-type resource pool in the third resource pool subset belongs to a first behavior set, and the first behavior set comprises one or more of periodicity, semi-persistent or aperiodicity.

In one subembodiment of the above embodiment, there exists a time-domain behavior of a second-type resource pool in the second resource pool set not belonging to the first behavior set.

In one embodiment, a value of a higher-layer parameter usage configured for any second-type resource pool in the third resource pool subset belongs to a first parameter value set, and the first parameter value set comprises one or more of beam Management, codebook, nonCodebook or antennaSwitching.

In one subembodiment of the above embodiment, there exist a value of a higher-layer parameter usage configured for a second-type resource pool in the second resource pool set not belonging to the first parameter value set.

In one embodiment, the spatial-domain filter refers to spatial-domain filter.

In one embodiment, the multi-antenna relevant transmission is a Spatial-domain transmission filter.

In one embodiment, the spatial-domain filter comprises a spatial-domain receive filter.

In one embodiment, the meaning of the phrase of the first reference signal being used to determine a spatial-domain filter of the second signal includes: a spatial-domain filter of the first reference signal is used to determine a spatial-domain filter of the second signal.

In one embodiment, the meaning of the phrase of the first reference signal being used to determine a spatial-domain filter of the second signal includes: the first node uses a same spatial-domain filter to receive the first reference signal and transmit the second signal.

In one embodiment, the meaning of the phrase of the first reference signal being used to determine a spatial-domain filter of the second signal includes: the first node uses a same spatial-domain filter to transmit the first reference signal and the second signal.

In one embodiment, the meaning of the phrase of the first reference signal being used to determine a spatial-domain filter of the second signal includes: DMRS of the second signal and the first reference signal are QCL.

In one embodiment, the meaning of the phrase of the first reference signal being used to determine a spatial-domain filter of the second signal includes: any DMRS of the second signal and the first reference signal are QCL.

In one embodiment, the meaning of the phrase of the first reference signal being used to determine a spatial-domain filter of the second signal includes: the first reference signal is used to determine a precoding of the second signal.

In one embodiment, the meaning of the phrase of the first reference signal being used to determine a spatial-domain filter of the second signal includes: the first reference signal is configured with a port group; the second signal is transmitted by the port group; and the port group comprises at least one port.

In one subembodiment of the above embodiment, a port in the port group comprises an antenna port.

In one subembodiment of the above embodiment, a port in the port group comprises an SRS port.

Embodiment 12

Embodiment 12 illustrates a schematic diagram of a first signaling and a first signal according to one embodiment of the present disclosure, as shown in FIG. 12. In Embodiment 12, the first signaling is used to determine scheduling information of the first signal.

In one embodiment, the first signal comprises a baseband signal.

In one embodiment, the first signal comprises a radio signal.

In one embodiment, the first signal comprises a radio-frequency signal.

In one embodiment, the first signal carries a first bit block, and the first bit block comprises at least one of a TB, a CB or a CBG.

In one embodiment, the scheduling information comprises one or more of time-domain resources, frequency-domain resources, a Modulation and Coding Scheme (MCS), a DMRS port, a HARQ process number, a Redundancy Version (RV) or a New Data Indicator (NDI).

In one embodiment, the first signaling comprises the scheduling information of the first signal.

In one embodiment, the first signaling explicitly indicates the scheduling information of the first signal.

In one embodiment, the first signaling implicitly indicates the scheduling information of the first signal.

In one embodiment, the first signaling explicitly indicates a part of the scheduling information of the first signal and implicitly indicates another part of the scheduling information of the first signal.

In one embodiment, the first signaling indicates time-domain resources occupied by the first signal.

In one embodiment, the first signaling belongs to a third time unit in time domain, the first signal belongs to a fourth time unit in time domain, and the first signaling indicates a time interval between the third time unit and the fourth time unit.

In one embodiment, the first signaling indicates a position of a first symbol occupied by the first signal in the fourth time unit.

In one embodiment, an end time of the third time unit is not later than a start time of the fourth time unit.

In one embodiment, the first reference signal is used to determine QCL parameters of the first signal.

In one embodiment, the first node assumes that DMRS of a PDSCH bearing the first node and the first reference signal are QCL.

In one embodiment, the first node assumes that DMRS of a PDSCH bearing the first node and the first reference signal are QCL corresponding to QCL-TypeA and/or QCL-TypeD.

In one embodiment, the first node assumes that a transmitting antenna port of the first signal and the first reference signal are QCL.

In one embodiment, the first node receives the first reference signal and the first signal with a same spatial-domain filter.

In one embodiment, the first node transmits the first reference signal and receives the first signal with a same spatial-domain filter.

In one embodiment, large-scale properties of a channel that the first reference signal goes through can be used to infer large-scale properties of a channel that the first signal goes through.

Embodiment 13

Embodiment 13 illustrates a schematic diagram of a first signaling, a third signal and a target time according to one embodiment of the present disclosure, as shown in FIG. 13. In embodiment 13, the third signal is used to determine that the first signaling is correctly received; time-domain resources occupied by the third signal are used to determine the target time, and the first signaling is used to determine the time-domain resources occupied by the third signal.

In one embodiment, the third signal indicates that the first signaling is correctly received.

In one embodiment, the third signal comprises a baseband signal.

In one embodiment, the third signal comprises a radio signal.

In one embodiment, the third signal comprises a radio-frequency signal.

In one embodiment, the third signal comprises UCI.

In one embodiment, the third signal comprises a Hybrid Automatic Repeat reQuest-Acknowledgement (HARQ-ACK).

In one embodiment, the third signal comprises a HARQ-ACK for the first signaling.

In one embodiment, the third signal comprises a HARQ-ACK for the first signal.

In one embodiment, the HARQ-ACK comprises an ACK.

In one embodiment, the HARQ-ACK comprises a Negative ACKnowledgement (NACK).

In one embodiment, the third signal comprises an ACK.

In one embodiment, the third signal indicates whether the first signal is correctly received.

In one embodiment, the third signal indicates that the first signal is correctly received.

In one embodiment, the third signal indicates whether the first bit block is correctly received.

In one embodiment, the third signal indicates that the first bit block is correctly received.

In one embodiment, the second reference signal is used to determine a spatial-domain filter of the third signal.

In one embodiment, a transmitter of the first signaling judges whether the first signaling is correctly received according to whether the third signal is received; if the third signal is received, it is judged that the first signaling is correctly received; if the third signal is not received, it is judged that the first signaling is not correctly received.

In one embodiment, a time interval between the target time and a second reference time is a fourth interval; the second reference time is not later than the target time, and time-domain resources occupied by the third signal are used to determine the second reference time.

In one embodiment, the second reference time is a start time of time-domain resources occupied by the third signal.

In one embodiment, the second reference time is an end time of time-domain resources occupied by the third signal.

In one embodiment, the second reference time is a start time of a time unit occupied by the third signal.

In one embodiment, the second reference time is an end time of a time unit occupied by the third signal.

In one embodiment, the fourth interval is measured by the time unit.

In one embodiment, the fourth interval is measured by slot.

In one embodiment, the fourth interval is measured by sub-slot.

In one embodiment, the fourth interval is measured by symbol.

In one embodiment, the fourth interval is a non-negative integer.

In one embodiment, the fourth interval is equal to 0.

In one embodiment, the fourth interval is greater than 0.

In one embodiment, the fourth interval is fixed.

In one embodiment, the fourth interval is configured by a higher-layer parameter.

In one embodiment, the first signaling indicates the fourth interval.

In one embodiment, the first signaling indicates time-domain resources occupied by the third signal.

In one embodiment, time-domain resources occupied by the first signaling are used to determine time-domain resources occupied by the third signal.

In one embodiment, the first signaling belongs to a first time unit in time domain, the third signal belongs to a second time unit in time domain, and a time interval between the first time unit and the second time unit is a fifth interval.

In one embodiment, the first signal belongs to a first time unit in time domain, the third signal belongs to a second time unit in time domain, and a time interval between the first time unit and the second time unit is a fifth interval.

In one embodiment, the fifth interval is default.

In one embodiment, the fifth interval is fixed.

In one embodiment, the first signaling indicates the fifth interval.

In one embodiment, the fifth interval is configured by an RRC signaling.

In one embodiment, the fifth interval is measured by the time unit.

In one embodiment, the fifth interval is measured by slot.

In one embodiment, the fifth interval is measured by symbol.

In one embodiment, the fifth interval is a non-negative integer.

In one embodiment, the fifth interval is equal to 0.

In one embodiment, the fifth interval is greater than 0.

In one embodiment, an end time of the first time unit is not later than a start time of the second time unit.

In one embodiment, a time interval between two time units refers to: a time interval between a start time of a prior time unit in the two time units and a start time of a later time unit in the two time units.

In one embodiment, a time interval between two time units refers to: a time interval between an end time of a prior time unit in the two time units and an end time of a later time unit in the two time units.

In one embodiment, a time interval between two time units refers to: a time interval between an end time of a prior time unit in the two time units and a start time of a later time unit in the two time units.

In one embodiment, a position of a first symbol occupied by the third signal in the second time unit is configured by an RRC signaling.

In one embodiment, the first signaling indicates a position of a first symbol occupied by the third signal in the second time unit.

In one embodiment, the meaning of the phrase of the first signaling being used to determine a target time includes: time-domain resources occupied by the third signal are used to determine the target time, and the first signaling is used to determine time-domain resources occupied by the third signal.

Embodiment 14

Embodiment 14 illustrates a schematic diagram of there existing a reference signal in a first reference signal set being associated with a first cell and there exists a reference signal in a second reference signal set being associated with a second cell, as shown in FIG. 14.

In one embodiment, any reference signal in the first reference signal set is associated with the first cell.

In one embodiment, there exists a reference signal in the first reference signal set being associated with the second cell.

In one embodiment, there exists a reference signal in the first reference signal set being associated with a cell different from the first cell.

In one embodiment, any reference signal in the first reference signal set is associated with a serving cell of the first node.

In one embodiment, there exists a reference signal in the first reference signal set being associated with a non-serving cell of the first node.

In one embodiment, the non-serving cell in the present disclosure can be used to transmit data.

In one embodiment, a non-serving cell in the present disclosure refers to a cell that can be used to transmit and receive data in candidate.

In one embodiment, any reference signal in the second reference signal set is associated with the second cell.

In one embodiment, there exists a reference signal in the second reference signal set being associated with a cell different from the second cell.

In one embodiment, there exists a reference signal in the second reference signal set being associated with the first cell.

In one embodiment, any reference signal in the second reference signal set is associated with the first cell or the second cell.

In one embodiment, there exists a reference signal in the second reference signal set being associated with a cell different from the first cell and the second cell.

In one embodiment, there exists a reference signal in the second reference signal set being associated with a non-serving cell of the first node.

In one embodiment, any reference signal in the second reference signal set is associated with a non-serving cell of the first node.

In one embodiment, there exists a reference signal in the second reference signal set being associated with a serving cell of the first node.

In one embodiment, any reference signal in the second reference signal set is associated with a serving cell of the first node.

In one embodiment, the meaning of the phrase of a reference signal being associated with a given cell includes: a Physical Cell Identity (PCI) of the given cell is used to generate the reference signal; and the given cell is the first cell or the second cell.

In one embodiment, the meaning of the phrase of a reference signal being associated with a given cell includes: the reference signal and an SSB of the given cell are QCL; and the given cell is the first cell or the second cell.

In one embodiment, the meaning of the phrase of a reference signal being associated with a given cell includes: the reference signal is transmitted by the given cell; and the given cell is the first cell or the second cell.

In one embodiment, the meaning of the phrase of a reference signal being associated with a given cell includes: radio resources occupied by the reference signal are indicated by a configuration signaling, an RLC bearer that the configuration signaling goes through is configured by a CellGroupConfig IE, and a Special Cell (SpCell) configured by the CellGroupConfig IE comprises the given cell; and the given cell is the first cell or the second cell.

In one subembodiment of the above embodiment, the configuration signaling comprises an RRC signaling.

In one subembodiment of the above embodiment, the radio resources comprise time-frequency resources.

In one subembodiment of the above embodiment, the radio resources comprise an RS sequence.

In one subembodiment of the above embodiment, the radio resources comprise code-domain resources.

In one embodiment, the first cell is different from the second cell.

In one embodiment, the first cell and the second cell correspond to different PCIs.

In one embodiment, the first cell and the second cell correspond to different CellIdentities.

In one embodiment, the first cell and the second cell correspond to different SCellIndexes.

In one embodiment, the first cell and the second cell correspond to different ServCellIndexes.

In one embodiment, a maintenance base station of the first cell and a maintenance base station of the second cell are different.

In one embodiment, a maintenance base station of the first cell and a maintenance base station of the second cell are not QCL.

In one embodiment, a maintenance base station of the first cell and a maintenance base station of the second cell are the same.

In one embodiment, the first cell and the second cell are receptively a Primary Cell (PCell) and a Primary Secondary Cell Group Cell (PSCell) of the first node.

In one embodiment, the first cell and the second cell respectively belong to a Master Cell Group (MCG) and a Secondary Cell Group (SCG) of the first node.

In one embodiment, the first cell and the second cell respectively belong to two different Cell Groups (CGs) of the first node.

In one embodiment, the first cell and the second cell belong to the same CG of the first node.

In one embodiment, frequency-domain resources occupied by the first cell and frequency-domain resources occupied by the second cell are overlapped.

In one embodiment, the first cell is a serving cell of the first node, and the second cell is a non-serving cell of the first node.

In one embodiment, the first cell and the second cell are both serving cells of the first node.

In one embodiment, the meaning of the phrase of the second cell being a non-serving cell of the first node includes: the first node does not execute SCell addition for the second cell.

In one embodiment, the meaning of the phrase of the second cell being a non-serving cell of the first node includes: a sCellToAddModList newly received by the first node does not comprise the second cell.

In one embodiment, the meaning of the phrase of the second cell being a non-serving cell of the first node includes: a sCellToAddModList and a sCellToAddModList-SCG newly received by the first node does not comprise the second cell.

In one embodiment, the meaning of the phrase of the second cell being a non-serving cell of the first node includes: the first node is not allocated a SCellIndex for the second cell.

In one embodiment, the SCellIndex is a positive integer no greater than 31.

In one embodiment, the meaning of the phrase of the second cell being a non-serving cell of the first node includes: the first node is not allocated a ServCellIndex for the second cell.

In one embodiment, the ServCellIndex is non-negative integer not greater than 31.

In one embodiment, the meaning of the phrase of the second cell being a non-serving cell of the first node includes: the second cell is not a PCell of the first node.

In one embodiment, the meaning of the phrase of the second cell being a non-serving cell of the first node includes: no RRC connection is established between the first node and the second cell.

In one embodiment, the meaning of the phrase of the second cell being a non-serving cell of the first node includes: a Cell-Radio Network Temporary Identifier (C-RNTI) of the first node is not allocated by the second cell.

In one embodiment, the meaning of the phrase of a given cell is a serving cell of the first node includes: the first node executes an SCell addition for the given cell; and the given cell is the first cell or the second cell.

In one embodiment, the meaning of the phrase of a given cell is a serving cell of the first node includes: a sCellToAddModList newly received by the first node comprises the given cell; and the given cell is the first cell or the second cell.

In one embodiment, the meaning of the phrase of a given cell is a serving cell of the first node includes: a sCellToAddModList or a sCellToAddModListSCG newly received by the first node comprises the given cell; and the given cell is the first cell or the second cell.

In one embodiment, the meaning of the phrase of a given cell is a serving cell of the first node includes: the first node is allocated a SCellIndex for the given cell; and the given cell is the first cell or the second cell.

In one embodiment, the meaning of the phrase of a given cell is a serving cell of the first node includes: the first node is allocated a ServCellIndex for the given cell; and the given cell is the first cell or the second cell.

In one embodiment, the meaning of the phrase of a given cell is a serving cell of the first node includes: an RRC connection has been established between the first node and the given cell; and the given cell is the first cell or the second cell.

In one embodiment, the meaning of the phrase of a given cell is a serving cell of the first node includes: a C-RNTI of the first node is allocated by the given cell; and the given cell is the first cell or the second cell.

In one embodiment, both the first cell and the second cell maintain an RRC connection with the first node.

In one embodiment, only the first cell in the first cell and the second cell maintains an RRC connection with the first node.

In one embodiment, the second node is a maintenance base station of the first cell.

In one embodiment, the second node is a maintenance base station of the second cell.

In one embodiment, the second node is not a maintenance base station of the second cell.

In one embodiment, a cell maintained by the second node is a serving cell of the first node.

In one embodiment, the third node is a maintenance base station of the second cell.

In one embodiment, any cell maintained by the third node is a non-serving cell of the first node.

In one embodiment, a cell maintained by the third node is a serving cell of the first node.

Embodiment 15

Embodiment 15 illustrates a schematic diagram of a first information block according to one embodiment of the present disclosure, as shown in FIG. 15. In embodiment 15, the first information block is used to determine the first reference signal set and the second reference signal set.

In one embodiment, the first information block is carried by a higher-layer signaling.

In one embodiment, the first information block is carried by an RRC signaling.

In one embodiment, the first information block is carried by a Medium Access Control Layer Control Element (MAC CE) signaling.

In one embodiment, the first information block is carried by an RRC signaling and a MAC CE signaling together.

In one embodiment, the first information block comprises information in all or partial fields in an IE.

In one embodiment, the first information block comprises information in a plurality of IEs.

In one embodiment, the first information block comprises information in partial fields in a PDSCH-Config IE.

In one embodiment, the first information block comprises information in a tci-StatesToAddModList and/or a tci-StatesToReleaseList field in a PDSCH-Config IE.

In one embodiment, the first information block comprises information in a TCI-State IE.

In one embodiment, the first information block indicates the first reference signal set and the second reference signal set.

In one embodiment, the first information block indicates an index of each reference signal in the first reference signal set and an index of each reference signal in the second reference signal set.

In one embodiment, the first information block indicates configuration information of each reference signal in the first reference signal set and configuration information of each reference signal in the second reference signal set.

In one embodiment, configuration information of a reference signal comprises at least one of code-domain resources, frequency-domain resources, code-domain resources, a time-domain behavior, a number of ports, a cyclic shift or an OCC.

In one embodiment, all reference signals in the first reference signal set and all reference signals in the second reference signal set consist of M reference signals, M being a positive integer greater than 1; for any given reference signal in the M reference signals, one of M1 TCI states indicates the given reference signal, M1 being a positive integer greater than 1.

In one embodiment, the M reference signals are different from each other.

In one embodiment, any of the M reference signals belongs to at least one of the first reference signal set or the second reference signal set.

In one embodiment, any of the M reference signals belongs to the first reference signal set or the second reference signal set.

In one embodiment, M1 is equal to M, and the M1 TCI states respectively indicate the M reference signals.

In one embodiment, M1 is less than M, and there exists one of the M1 TCI states indicating two of the M reference signals.

In one embodiment, M1 is greater than M, and there exist two of the M1 TCI states indicating a same one of the M reference signals.

In one embodiment, the first signaling indicates a first TCI state out of the M1 TCI states, and the first TCI state indicates the first reference signal.

In one embodiment, the first information block indicates the M1 TCI states.

In one embodiment, the first information block comprises M1 information sub-blocks, and the M1 information sub-blocks respectively comprise configuration information of the M1 TCI states.

In one subembodiment of the above embodiment, any of the M1 information subblocks comprises information in all or partial fields in a TCI-State IE.

In one subembodiment of the above embodiment, the M1 information sub-blocks are respectively M1 TCI-State IEs.

In one embodiment, the M1 TCI states are subsets of M0 TCI states, M0 being a positive integer not less than M1; the first information block comprises a first information sub-block and a second information sub-block, and the first information sub-block comprises configuration information of the M0 TCI states; the second information sub-block activates the M TCI states out of the M0 TCI states.

In one subembodiment of the above embodiment, the first information sub-block is carried by an RRC signaling.

In one subembodiment of the above embodiment, the first information sub-block comprises M0 TCI-State IEs.

In one subembodiment of the above embodiment, the second information sub-block is carried by a MAC CE signaling.

In one embodiment, for any of the M reference signals associated with the first cell, the first information block indicates a first index, and the first index is used to identify the first cell; for any of the M reference signals associated with the second cell, the first information block indicates a second index, and the second index is used to identify the second cell; and the first index and the second index are respectively non-negative integers.

In one subembodiment of the above embodiment, the first index and the second index respectively consist of Q1 bit(s) and Q2 bit(s), Q1 and Q2 are two different positive integers; and Q2 is greater than Q1.

In one subembodiment of the above embodiment, the first index is a SCellIndex corresponding to the first cell.

In one subembodiment of the above embodiment, the first index is a ServCellIndex corresponding to the first cell.

In one subembodiment of the above embodiment, the first index is a CellIdentity corresponding to the first cell.

In one subembodiment of the above embodiment, the first index is a PhysCellId corresponding to the first cell.

In one subembodiment of the above embodiment, the second index is a SCellIndex corresponding to the second cell.

In one subembodiment of the above embodiment, the second index is a ServCellIndex corresponding to the second cell.

In one subembodiment of the above embodiment, the second index is a CellIdentity corresponding to the second cell.

In one subembodiment of the above embodiment, the second index is a PhysCellId corresponding to the second cell.

Embodiment 16

Embodiment 16 illustrates a structure block diagram of a processing device in a first node according to one embodiment of the present disclosure, as shown in FIG. 16. In FIG. 16, the processing device 1600 in the first node comprises a first processor 1601.

In embodiment 16, the first transmitter 1601 receives a first signaling and monitors a first-type channel in a first resource pool set.

In embodiment 16, the first signaling is used to determine a target time; the first resource pool set comprises more than one first-type resource pool; the first signaling is used to determine a first reference signal; a first resource pool subset and a second resource pool subset respectively comprise at least one first-type resource pool in the first resource pool set, and there exists a first-type resource pool in the first resource pool set only belonging to one of the first resource pool subset and the second resource pool subset; a target resource pool subset is the first resource pool subset or the second resource pool subset; after the target time, for the first-type channel monitoring performed in the target resource pool subset, the first node assumes same QCL parameters as the first reference signal; the first reference signal belongs to a first reference signal set or a second reference signal set, and the first reference signal set and the second reference signal set respectively comprise at least one reference signal; based on whether the first reference signal belongs to the first reference signal set or the second reference signal set, the UE determines in which first-type resource pool(s) the UE assumes same QCL parameters as the first reference signal for the first-type channel monitoring after the target time; when the first reference signal belongs to the first reference signal set, the target resource pool subset is the first resource pool subset; and when the first reference signal belongs to the second reference signal set, the target resource pool subset is the second resource pool subset.

In one embodiment, a first resource pool is a first-type resource pool in the first resource pool set; before the target time, for the first-type channel monitoring performed in the first resource pool, the first node assumes same QCL parameters as a second reference signal.

In one embodiment, the target resource pool subset only comprises partial first-type resource pools in the first resource pool set, and the first resource pool is a first-type resource pool in the first resource pool set not belonging to the target resource pool subset; after the target time, for the first-type channel monitoring performed in the first resource pool, the first node assumes same QCL parameters as the second reference signal.

In one embodiment, the first processor 1601 transmits a second signal in a second resource pool; herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

In one embodiment, the first processor 1601 receives a first signal; herein, the first signaling is used to determine scheduling information of the first signal.

In one embodiment, the first processor 1601 transmits a third signal; herein, the third signal is used to determine that the first signaling is correctly received; time-domain resources occupied by the third signal are used to determine the target time, and the first signaling is used to determine the time-domain resources occupied by the third signal.

In one embodiment, the first processor 1601 receives a first signal and transmits a third signal; herein, the first signaling is used to determine scheduling information of the first signal; the third signal is used to determine that the first signaling is correctly received; time-domain resources occupied by the third signal are used to determine the target time, and the first signaling is used to determine the time-domain resources occupied by the third signal.

In one embodiment, there exists a reference signal in the first reference signal set being associated with a first cell, and there exists a reference signal in the second reference signal set being associated with a second cell.

In one embodiment, the first processor 1601 receives a first information block; herein, the first information block is used to determine the first reference signal set and the second reference signal set.

In one embodiment, the first node is a UE.

In one embodiment, the first node is a relay node.

In one embodiment, the first processor 1601 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

Embodiment 17

Embodiment 17 illustrates a structure block diagram of a processing device in a second node according to one embodiment of the present disclosure, as shown in FIG. 17. In FIG. 17, the processing device 1700 in the second node comprises a second processor 1701.

In embodiment 17, the second processor 1701 transmits the first signaling; the second processor 1701 transmits a first-type channel in a target resource pool subset after a target time, or, the second processor drops transmitting a first-type channel in a target resource pool subset after a target time.

In embodiment 17, the first signaling is used to determine the target time; the first signaling is used to determine a first reference signal; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; after the target time, the first reference signal is used to determine a spatial relation of the first-type channel transmitted in the target resource pool subset; the first reference signal belongs to a first reference signal set or a second reference signal set, and the first reference signal set and the second reference signal set respectively comprise at least one reference signal; whether the first reference signal belongs to the first reference signal set or the second reference signal set is used to determine in which first-type resource pool(s) the first reference signal is used to determine the spatial relation of the first-type channel after the target time; when the first reference signal belongs to the first reference signal set, the target resource pool subset is the first resource pool subset; and when the first reference signal belongs to the second reference signal set, the target resource pool subset is the second resource pool subset.

In one embodiment, a first resource pool is a first-type resource pool in the first resource pool set; before the target time, a second reference signal is used to determine the spatial relation of the first-type channel transmitted in the first resource pool.

In one embodiment, the target resource pool subset only comprises partial first-type resource pools in the first resource pool set, and the first resource pool is a first-type resource pool in the first resource pool set not belonging to the target resource pool subset; after the target time, the second reference signal is used to determine the spatial relation of the first-type channel transmitted in the first resource pool.

In one embodiment, the second processor 1701 receives a second signal in a second resource pool, or the second processor 1701 drops receiving a second signal in a second resource pool; herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

In one embodiment, the second processor 1701 transmits a first signal; herein, the first signaling is used to determine scheduling information of the first signal.

In one embodiment, the second processor 1701 also receives a third signal; herein, the third signal is used to determine that the first signaling is correctly received; time-domain resources occupied by the third signal are used to determine the target time, and the first signaling is used to determine the time-domain resources occupied by the third signal.

In one embodiment, the second processor 1701 transmits a first signal and receives a third signal; herein, the first signaling is used to determine scheduling information of the first signal; the third signal is used to determine that the first signaling is correctly received; time-domain resources occupied by the third signal are used to determine the target time, and the first signaling is used to determine the time-domain resources occupied by the third signal.

In one embodiment, there exists a reference signal in the first reference signal set being associated with a first cell, and there exists a reference signal in the second reference signal set being associated with a second cell.

In one embodiment, the second processor 1701 transmits a first information block; herein, the first information block is used to determine the first reference signal set and the second reference signal set.

In one embodiment, the second node is a base station.

In one embodiment, the second node is a UE.

In one embodiment, the second node is a relay node.

In one embodiment, the second processor 1701 comprises at least one of the antenna 420, the receiver/transmitter 418, the receiving processor 470, the transmitting processor 416, the multi-antenna receiving processor 472, the multi-antenna transmitting processor 471, the controller/processor 475, or the memory 476 in Embodiment 4.

Embodiment 18

Embodiment 18 illustrates a structure block diagram of a processing device in a third node according to one embodiment of the present disclosure, as shown in FIG. 18. In FIG. 18, the processing device 1800 in the third node comprises a third processor 1801.

In embodiment 18, the third processor 1801 transmits a first-type channel in a target resource pool subset, or, drops transmitting a first-type channel in a target resource pool subset;

in embodiment 18, a second information block is used to determine whether the first-type channel is transmitted in the target resource pool subset; when the second information block is used to determine that the first-type channel is transmitted in the target resource pool subset, the second information block indicates a first reference signal, and the first reference signal is used to determine a spatial relation of the first-type channel transmitted in the target resource pool subset; a first resource pool set comprises more than one first-type resource pool, a first resource pool subset and a second resource pool subset respectively comprise at least one first-type resource pool in the first resource pool set, and there exists a first-type resource pool in the first resource pool set only belonging to one of the first resource pool subset and the second resource pool subset; the target resource pool subset is the first resource pool subset or the second resource pool subset; the first reference signal belongs to a first reference signal set or a second reference signal set, and the first reference signal set and the second reference signal set respectively comprise at least one reference signal; when the first reference signal belongs to the first reference signal set, the target resource pool subset is the first resource pool subset; and when the first reference signal belongs to the second reference signal set, the target resource pool subset is the second resource pool subset.

In one embodiment, the third processor 1801 receives the second information block.

In one embodiment, the third processor 1801 receives a second signal in a second resource pool, or the third processor 1801 drops receiving a second signal in a second resource pool; herein, the second resource pool is a second-type resource pool in a second resource pool set, and the second resource pool set comprises more than one second-type resource pool; when the first reference signal belongs to the first reference signal set, the first reference signal is used to determine a spatial-domain filter of the second signal; when the first reference signal belongs to the second reference signal set, whether the first reference signal is used to determine a spatial-domain filter of the second signal is related to whether the second resource pool belongs to a third resource pool subset; the third resource pool subset comprises at least one second-type resource pool in the second resource pool set.

In one embodiment, there exists a reference signal in the first reference signal set being associated with a first cell, and there exists a reference signal in the second reference signal set being associated with a second cell.

In one embodiment, the third node is a base station.

In one embodiment, the third node is a UE.

In one embodiment, the third node is a relay node.

In one embodiment, the third processor 1801 comprises at least one of the antenna 420, the receiver/transmitter 418, the receiving processor 470, the transmitting processor 416, the multi-antenna receiving processor 472, the multi-antenna transmitting processor 471, the controller/processor 475, or the memory 476 in Embodiment 4.

Embodiment 19

Embodiment 19 illustrates a schematic diagram of a given reference signal being used to determine a spatial relation of a first-type channel transmitted in a given resource pool according to one embodiment of the present disclosure, as shown in FIG. 19. In embodiment 19, the given reference signal is the first reference signal or the second reference signal, and the given resource pool is any resource pool or the first resource pool in the target resource pool subset.

In one embodiment, the given reference signal is the first reference signal, and the given resource pool is any resource pool in the target resource pool subset.

In one embodiment, the given reference signal is the second reference signal, and the given resource pool is the first resource pool.

In one embodiment, the meaning of the phrase of a given reference signal being used to determine a spatial relation of a first-type channel transmitted in a given resource pool includes: the second node uses a same spatial-domain filter to transmit the given reference signal and transmit the first-type channel in the given resource pool.

In one embodiment, the meaning of the phrase of a given reference signal being used to determine a spatial relation of a first-type channel transmitted in a given resource pool includes: the second node uses a same spatial-domain filter to receive the given reference signal and transmit the first-type channel in the given resource pool.

In one embodiment, the meaning of the phrase of a given reference signal being used to determine a spatial relation of a first-type channel transmitted in a given resource pool includes: DMRS of the first-type channel transmitted in the given resource pool and the given reference signal are QCL.

In one embodiment, the meaning of the phrase of a given reference signal being used to determine a spatial relation of a first-type channel transmitted in a given resource pool includes: DMRS of the first-type channel transmitted in the given resource pool and the given reference signal are QCL corresponding to QCL-TypeA and/or QCL-TypeD.

In one embodiment, the meaning of the phrase of a given reference signal being used to determine a spatial relation of a first-type channel transmitted in a given resource pool includes: a target receiver of the first-type channel uses a same spatial-domain filter to receive the given reference signal and monitor and/or receive the first-type channel in the given resource pool.

In one embodiment, the meaning of the phrase of a given reference signal being used to determine a spatial relation of a first-type channel transmitted in a given resource pool includes: a target receiver of the first-type channel uses a same spatial-domain filter to transmit the given reference signal and monitor and/or receive the first-type channel in the given resource pool.

In one embodiment, the meaning of the phrase of a given reference signal being used to determine a spatial relation of a first-type channel transmitted in a given resource pool includes: large-scale properties of a channel that the given reference signal goes through can be used to infer large-scale properties of a channel that the first-type channel transmitted in the given resource pool goes through.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, vehicles, cars, RSUs, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The base station or system equipment in the present disclosure includes but is not limited to macro-cellular base stations, micro-cellular base stations, Pico base stations, home base stations, relay base stations, eNB, gNB, Transmitter Receiver Points (TRPs), GNSS, relay satellites, satellite base stations, space base stations, RSUs, UAVs, test devices, such as a transceiver or a signaling tester that simulates some functions of a base station, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE), comprising:
a processor;
a receiver; and
a transmitter;
the processor and the receiver configured to receive a first signaling;
the processor and the receiver configured to determine a first reference signal based on the first signaling, wherein the first reference signal belongs to a first reference signal set or a second reference signal set;
the processor and the receiver configured to determine, based on whether the first reference signal belongs to the first reference signal set or the second reference signal set, one or more Control Resource Sets (CORE-SETs) in which a Quasi Co-Location (QCL) relationship with the first reference signal is assumed when monitoring a Physical Downlink Control Channel (PDCCH) after a target time;
the processor and the receiver configured to determine the target time based on the first signaling; and
the processor and the receiver configured to monitor the PDCCH after the target time in a first resource pool set that comprises a first resource pool subset and a second resource pool subset,
wherein the determined one or more CORESETSs are part of a target resource pool subset,
wherein, when the first reference signal belongs to the first reference signal set, the target resource pool subset is the first resource pool subset, and
wherein, when the first reference signal belongs to the second reference signal set, the target resource pool subset is the second resource pool subset.

2. The UE of claim 1, wherein at least one of the one or more CORESETs belongs to the first resource pool set, and wherein, before the target time, for the one of the one or more CORESETs, a QCL relationship with a second reference signal is assumed.

3. The UE of claim 1, wherein the processor, the receiver, and a transmitter are configured to:

receive a first signal; or transmit a third signal;

wherein the first signaling is used to determine scheduling information of the first signal, wherein the third signal is used to determine that the first signaling is correctly received, wherein time-domain resources occupied by the third signal are used to determine the target time, and wherein the first signaling is used to determine the time-domain resources occupied by the third signal.

4. The UE of claim 1, wherein a reference signal in the first reference signal set is associated with a first cell, and wherein a reference signal in the second reference signal set is associated with a second cell, and wherein the first cell and the second cell correspond to different Physical Cell Identities (PCIs).

5. The UE of claim 1, wherein the processor is configured to receive a first information block, wherein the first information block is used to determine the first reference signal set and the second reference signal set.

6. A Base Station comprising:

a processor; a transmitter; and a receiver;

the processor and the transmitter configured to transmit a first signaling, the first signaling being used to determine a target time;

the processor and the transmitter configured to transmit a first reference signal, wherein the first reference signal belongs to one of a first reference signal set or a second reference signal set;

the processor and the transmitter configured to transmit a Physical Downlink Control Channel (PDCCH) transmission in a target resource pool subset after the target time, wherein the target resource pool subset comprises at least one Control Resource Set (CORESET), or, drop transmitting a first-type channel in a target resource pool subset after the target time, wherein the target resource pool subset is one of a first resource pool subset of a first resource pool set or a second resource pool subset of the first resource pool set, wherein, when the first reference signal belongs to the first reference signal set, the target resource pool subset is the first resource pool subset, wherein, when the first reference signal belongs to the second reference signal set, the target resource pool subset is the second resource pool subset, and wherein, the at least one CORESET and the first reference signal have a Quasi Co-Location (QCL) relationship.

7. The Base Station of claim 6, wherein at least one of the one or more CORESETs belongs to the first resource pool set, wherein, before the target time, for the one of the one or more CORESETs, a QCL relationship with a second reference signal is assumed.

8. The Base Station according of 6, wherein the processor, the transmitter, and a receiver are configured to:

transmit a first signal; or receive a third signal;

wherein the first signaling is used to determine scheduling information of the first signal, wherein the third signal is used to determine that the first signaling is correctly received, wherein time-domain resources occupied by the third signal are used to determine the target time, and wherein the first signaling is used to determine the time-domain resources occupied by the third signal.

9. The Base Station of claim 6, wherein a reference signal in the first reference signal set is associated with a first cell, wherein a reference signal in the second reference signal set is associated with a second cell, wherein the first cell and the second cell correspond to different Physical Cell Identities (PCIs).

10. The Base Station of claim 6, wherein the processor is configured to transmit a first information block, wherein the first information block is used to determine the first reference signal set and the second reference signal set.

11. A method performed by a User Equipment (UE), the method comprising:

receiving a first signaling;

determining a first reference signal based on the first signaling, wherein the first reference signal belongs to a first reference signal set or a second reference signal set determining, based on whether the first reference signal belongs to the first reference signal set or the second reference signal set, one or more Control Resource Sets (CORESETs) in which a Quasi Co-Location (QCL) relationship with the first reference signal is assumed when monitoring a Physical Downlink Control Channel (PDCCH) after a target time;

determine the target time based on the first signaling; and monitoring the PDCCH after the target time in a first resource pool set, that comprises a first resource pool subset and a second resource pool subset, wherein the determined one or more CORESETSs are part of a target resource pool subset, wherein, when the first reference signal belongs to the first reference signal set, the target resource pool subset is the first resource pool subset, and wherein, when the first reference signal belongs to the second reference signal set, the target resource pool subset is the second resource pool subset.

12. The method according to claim 11, wherein at least one of the one or more CORESETs belongs to the first resource pool set, and wherein, before the target time, for the one of the one or more CORESETs, a QCL relationship with a second reference signal is assumed.

13. The UE of claim 11 further comprising:

receiving a first signal; or transmitting a third signal;

wherein the first signaling is used to determine scheduling information of the first signal, wherein the third signal is used to determine that the first signaling is correctly received, wherein time-domain resources occupied by the third signal are used to determine the target time, and wherein the first signaling is used to determine the time-domain resources occupied by the third signal.

14. The method of claim 11, wherein a reference signal in the first reference signal set is associated with a first cell, and wherein a reference signal in the second reference signal set is associated with a second cell, wherein the first cell and the second cell correspond to different Physical Cell Identities (PCIs).

15. The method of claim 11 further comprising:

receiving a first information block, wherein the first information block is used to determine the first reference signal set and the second reference signal set.

* * * * *